(12) United States Patent
Jayaraman et al.

(10) Patent No.: US 6,420,503 B1
(45) Date of Patent: Jul. 16, 2002

(54) NORBORNENE SULFONAMIDE POLYMERS

(75) Inventors: Saikumar Jayaraman, Twinsburg; Richard Vicari, Strongsville; Larry F. Rhodes, Silver Lake, all of OH (US); Pushkara Rao Varanasi, Poughkeepsie, NY (US); Thomas I. Wallow, Union City, CA (US); Ratnam Sooriyakumaran, San Jose, CA (US); Robert D. Allen, San Jose, CA (US); Richard A. DiPietro, San Jose, CA (US); Hiroshi Ito, San Jose, CA (US); Juliann Opitz, San Jose, CA (US)

(73) Assignees: Sumitomo Bakelite Co. Ltd., Tokyo (JP); International Business Machines Corp., Armonk, NY (US)

( * ) Notice: Subject to any disclaimer, the term of this patent is extended or adjusted under 35 U.S.C. 154(b) by 0 days.

(21) Appl. No.: 09/497,846

(22) Filed: Feb. 3, 2000

Related U.S. Application Data
(60) Provisional application No. 60/118,872, filed on Feb. 5, 1999.

(51) Int. Cl.⁷ .......................... C08F 28/06; C08F 24/00; C08F 26/06; C08F 32/00
(52) U.S. Cl. .................. 526/257; 526/259; 526/268; 526/271; 526/281; 526/283
(58) Field of Search ................. 526/243, 288, 526/256, 257, 286, 259, 268, 281, 283, 271

(56) References Cited

U.S. PATENT DOCUMENTS

| | | | | |
|---|---|---|---|---|
| 5,756,590 A | * | 5/1998 | Hopper | 525/351 |
| 5,929,181 A | * | 7/1999 | Makovetsky | 526/171 |
| 6,008,306 A | * | 12/1999 | Hafner | 526/171 |

FOREIGN PATENT DOCUMENTS

| | | |
|---|---|---|
| DE | 3720760 | 1/1989 |
| EP | 0731388 | 9/1996 |
| WO | 9733198 | 9/1997 |

OTHER PUBLICATIONS

Metz et al., Synlett (1996), Issue 8, 741–742—Abstract.
Abstract of Japanese Patent 11194496, dated Jul. 21, 1999.
Ito, Hiroshi et al., ACS Symp. Ser. (1998), 706(Micro– and Nanopatterning polymers), 208–223.
Abstract of German Patent DE 4242051 A, dated Jun. 16, 1994.
Abstract of Japanese Patent 96–609 960108.
Abstract of EP 773478.
Abstract of German Patent 19525050.
Abstract of EP 731388.
Abstract of EP 684521.
Abstract of EP 629917.
Abstract of Japanese Patent 07092680.
Abstract of German Patent 94–424050.
Abstract of WO 9418274.
Abstract of Japanese Patent 05080514.
REACCS–JSM 98.1, RXN 2 of 5 to 5 of 5.
Abstract of Japanese patent 11184090.
KAS'YAN: "fluorine–containing norbornene–series sulfonamides", ZH. ORG. KHIM, vol. 31, No. 3, 1995, pp. 357–364, XP000914232 cited in the application, p. 357; figures IIIA–VIA.
*IBM Technical Disclosure Bulletin*, vol. 11, No. 7, Dec. 1968.

\* cited by examiner

*Primary Examiner*—Christopher Henderson
(74) *Attorney, Agent, or Firm*—Hudak & Shunk Co. LPA; Thoburn T. Dunlap

(57) ABSTRACT

The invention is directed to polymers containing a repeating unit derived from a norbornene sulfonamide. These may be addition polymers which include copolymers with one or more comonomers such as norbornene, ethylene, an acrylate or sulfur dioxide or carbon monoxide. Said monomers may be polymerized using single or multicomponent Group VIII catalysts. The norbornene sulfonamides can also form ROMP polymers using known metathesis catalysts. Preferably the ROMP polymers may be hydrogenated to give more stable polymers.

20 Claims, No Drawings

NORBORNENE SULFONAMIDE POLYMERS

This application claims the benefit of provisional application 60/118,872 filed Feb. 5, 1999.

BACKGROUND OF THE INVENTION

Certain phenyl sulfonamide polymers have been known at least since the late 1960's. R. W. Angelo et al., in IBM Technical Disclosure Bulletin, vol. 11, No. 7 (December 1968), disclosed condensing m-benzene disulfonyl chloride with hexamethylene diamine to form a phenyl sulfonamide polymer. Said publication further disclosed crosslinking polystyrene with then sulfonamide linkages which in turn can be treated to form the corresponding sulfonic acid or acid chloride which, when treated with a diamine such as hexamethylene diamine, forms a polystyrene sulfonamide. European Patent Application published on Sep. 11, 1996, EP 0 731 388 A2, discloses styryl and methacryl-based sulfornamide-containing polymers. T. X. Neenan et al., Microelectronics Technology, ACS Symposium Series 614, (April 2–6, 1995), pp. 194–206, also discuss styrylmethyl-sulfonamides. These specific polymers are said to be useful as photoresists, but they are deficient because they are not easily soluble in photoresist compatible solvents, such as propyleneglycol methyl ether acetate. PCT Patent Application published Sep. 12, 1997, WO 97/33198, discloses addition-type polymers of norbornene-type monomers, some containing functional groups such as carboxyl groups or esters, that may be obtained by polymerizing such monomers in the presence of Group VIII metal catalysts. European Patent Application published Aug. 13, 1997, EP 0 789 278 A2, discloses ROMP polymers obtained by polymerizing norbornene-type monomers that may contain functional substituents other than sulfonamides, by using well known metathesis catalysts. European Patent Application published Sep. 10, 1997, EP 0 794 458 A2, discloses the preparation of cyclic olefin copolymers, such as a norbornene/maleic anhydride and norbornene/maleic anhydride/acrylate, using free radical polymerization. None of the above mentioned publications disclose NB sulfonamides.

The preparation of fluorine-containing sulfonamide norbornenes is described by A. O. Kas'yan et al., Ukr. Gos. Khim-Tekhnol. Univ., Dnepropetrovsk, Ukraine, Zh. Org. Khim. (1995), 357–64. CODEN:ZORKAE; ISS 0514–7492. CAN 124:145481.

SUMMARY OF THE INVENTION

It is a general object of the invention to provide novel sulfonamide norbornene (NB) polymer compositions. Such polymers may be NB sulfonamide homopolymers or copolymers of at least one NB sulfonamide with at least one other comonomer such as NB, ethylene, an acrylate, maleic anhydride, CO, $SO_2$, and the like.

It is another object of the invention to provide certain novel NB sulfonamide monomers.

The addition homopolymers and copolymers of this invention may be prepared employing a single or multicomponent catalyst system, each containing a Group VIII metal ion source. Copolymers of an NB sulfonamide and maleic anhydride or $SO_2$ or maleic anhydride and an acrylate may be prepared employing a standard free radical catalyst. NB sulfonamide ROMP polymers may be prepared employing known ROMP catalysts and thereafter preferably hydrogenating the resulting polymer.

DETAILED DISCLOSURE

The polycyclic copolymers of the present invention comprise repeating units copolymerized from at least one polycycloolefin monomer wherein at least a portion of which contain a pendant sulfonamide group. As stated herein the terms "polycycloolefin," "polycyclic," and "norbornene-type" monomer are used interchangeably and mean that the monomer contains at least one norbornene-type moiety as shown below:

In the formula above, x represents oxygen, nitrogen with a substituent being hydrogen or $C_{1-10}$ alkyl, linear or branched, sulfur or a methylene group of the formula $-(CH_2)_{n'}-$ wherein n' is an integer of 1 to 5.

The simplest polycyclic monomer of the invention is the bicyclic monomer, bicyclo[2.2.1]hept-2-ene, commonly referred to as norbornene. The term norbornene-type monomer is meant to include substituted and unsubstituted norbornene-type monomers, and any substituted and unsubstituted higher cyclic derivatives thereof so long as the monomer contains at least one norbornene-type or substituted norbornene-type moiety. The substituted norbornene-type monomers and higher cyclic derivatives thereof contain a pendant hydrocarbyl substituent(s) or a pendant functional substituent(s) containing a heteroatom such as oxygen or nitrogen.

The sulfonamide functional norbornene-type monomers are represented by the structure below:

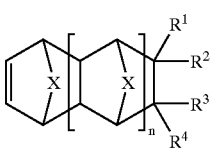

I wherein x represents oxygen, nitrogen with hydrogen or $C_{1-10}$ alkyl substituent, sulfur or a methylene group of the formula $-(CH_2)_{n'}-$; n is an integer of 0, 1 or more, preferably 0 to 5, and more preferably 0, 1, or 2; and $R^1$ and $R^4$ independently represent hydrogen, linear or branched linear and branched $C_1-C_{20}$ alkyl (preferably $C_{1-10}$); $R^2$ and $R^3$ independently represent hydrogen, linear and branched $C_1-C_{20}$ alkyl or a sulfonamide group, with the proviso that at least one of $R^2$ and $R^3$ is a pendant sulfonamide group of the formulae:

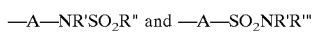

or a cyclic sulfonamide group formed by combining $R^2$ and $R^3$ together with the two ring carbon atoms to which they are attached to form a heterocyclic ring of the formula:

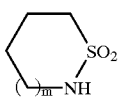

wherein in the above structures m is an integer from 1 to 3; R' represents hydrogen, linear and branched tri($C_1-C_{10}$) alkylsilyl, $-C(O)CF_3$, $-C(O)OR$, and $-OC(O)OR$, wherein R is lnear and branched $C_1-C_{10}$ alkyl, preferably t-butyl, linear and branched $C_1-C_{10}$ haloalkyl, substituted and unsubstituted $C_6-C_{14}$ aryl, and substituted and unsubstituted $C_7$-$C_{20}$ aralkyl. As used here and throughout the specification the term substituted cycloalkyl, aryl (e.g., phenyl), and aralkyl means that the respective rings can contain monosubstitution or multisubstitution and the substituents are independently selected from linear and branched $C_1$-$C_5$ alkyl, linear and branched $C_1$-$C_5$ haloalkyl, substituted and unsubstituted phenyl, and halogen, preferably, chlorine and fluorine;

R" represents linear and branched $C_1$-$C_{10}$ alkyl, linear and branched $C_1$-$C_{10}$ haloalkyl, —(CHR')$_{n"}$—COOR, —(CHR$^1$)$_{n"}$—OR, —(CHR$^1$)$_{n"}$—C(O)R, substituted and unsubstituted $C_3$ to $C_8$ cycloalkyl(as defined above), —(CHR')$_{n"}$ cyclic esters (lactones) containing 2 to 8 carbon atoms (not counting the carbonyl carbon), —(CHR')$_{n"}$ cyclic ketones containing 4 to 8 carbon atoms (not counting the carbonyl carbon), cyclic ethers and cyclic diethers containing 4 to 8 carbon atoms, wherein R, R$^{1'}$, and n" are as defined above;

R''' represents hydrogen, linear and branched $C_1$-$C_{10}$ alkyl, linear and branched $C_1$-$C_{10}$ haloalkyl, —C(O)OR, —(CHR$^1$)$_{n"}$—OR, —(CHR$^1$)$_{n"}$—C(O)R, substituted and unsubstituted $C_3$ to $C_8$ cycloalkyl(as defined above), —(CHR')$_{n"}$ cyclic esters (lactones) containing 2 to 8 carbon atoms (not counting the carbonyl carbon), —(CHR')$_{n"}$ cyclic ketones containing 4 to 8 carbon atoms (not counting the carbonyl carbon), cyclic ethers and cyclic diethers containing 4 to 8 carbon atoms, wherein R, R$^{1'}$, and n" are as defined above Monomers containing the foregoing group can be represented by Formula I(a) below:

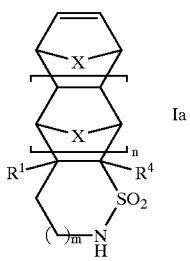

I(a)

In Formula I(a) x, R$^1$, R$^4$, n and m are as defined previously above. In Formula Ia R$^1$ and, R$^4$ are preferably hydrogen.

In the formulae above —A— is a divalent radical selected from —(CR$^{1'}$R$^{2'}$)$_{n"}$—; —(CHR$^{1'}$)$_{n"}$O(CHR$^{1'}$)$_{n"}$—; —(CHR$^{1'}$)$_{n"}$C(O)O(CHR$^{1'}$)$_{n"}$—; —(CHR$^{1'}$)$_{n"}$C(O)(CHR$^{1'}$)$_{n"}$—; $C_3$-$C_8$ cycloalkyl; $C_6$-$C_{14}$ aryl; cyclic ethers and cyclic diethers containing 4 to 8 carbon atoms, wherein n" represents an integer from 1 to 10, and R$^{1'}$ and R$^{2'}$ independently represent hydrogen, linear and branched $C_1$-$C_{10}$ alkyl and halogen, preferably chlorine and fluorine. Divalent radical —A— represents the group —(CHR$^{1'}$)$_{n"}$OC(O)— only when the sulfonamide group is —NR'SO$_2$R".

The divalent cycloalkyl radicals include substituted and unsubstituted $C_3$ to $C_8$ cycloalkyl moieties represented by the formula:

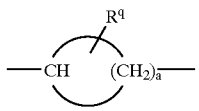

wherein "a" is an integer from 2 to 7 and optionally R$^q$ which, when present, represents linear and branched $C_1$-$C_{10}$, alkyl groups, linear and branched $C_1$-$C_{10}$ haloalkyl, and halogen, preferably chlorine and fluorine. As used here and throughout the specification the term haloalkyl means that at least one hydrogen atom on the alkyl radical is replaced by a halogen. The degree of halogenation can range from at least one hydrogen atom being replaced by a halogen atom (e.g., a monofluoromethyl group) to full halogenation (perhalogenation) wherein all hydrogen atoms on the alkyl group have been replaced by a halogen atom (e.g., trifluoromethyl (perfluoromethyl)). Preferred divalent cycloalkylene radicals include cyclopentylene and cyclohexylene moieties represented by the following structures:

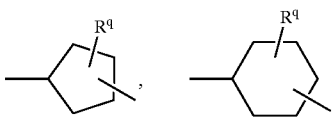

wherein R$^q$ is defined above. As illustrated here and throughout this specification, it is to be —(CHR')$_{n"}$ understood that the bond lines projecting from the cyclic structures and/or formulae represent the divalent nature of the moiety and indicate the points at which the carbocyclic atoms are bonded to the adjacent molecular moieties defined in the respective formulae. As is conventional in the art, the diagonal bond line projecting from the center of the cyclic structure indicates that the bond is optionally connected to any one of the carbocyclic atoms in the ring. It is also to be understood that the carbocyclic atom to which the bond line is connected will accommodate one less hydrogen atom to satisfy the valence requirement of carbon.

The divalent aryl radicals include substituted and unsubstituted aryl moieties. A representative divalent aryl moiety is shown below.

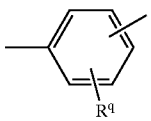

wherein R$^q$ is as defined above. In the above formulae R$^{1'}$ and R$^{2'}$ independently represent linear and branched $C_1$-$C_{10}$ alkyl, linear and branched $C_1$-$C_{10}$ haloalkyl, and halogen selected from chlorine, bromine, fluorine, and iodine, preferably fluorine.

The divalent cyclic ethers and diethers can be represented by the formulae:

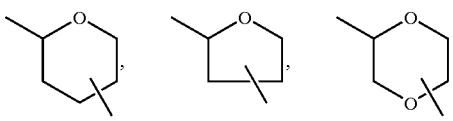

The norbornene-type monomers of Formula I can be copolymerized with hydrocarbyl and/or functionally substituted norbornene-type monomer(s) represented by Formula II below:

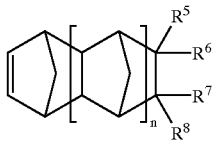

wherein $R^5$ to $R^8$ independently represents a hydrocarbyl or functional substituent and n is an integer of 0, 1 or more, preferably 0 to 5.

When the substituent is a hydrocarbyl group $R^5$ to $R^8$ independently represent hydrogen, linear and branched $C_1-C_{10}$ alkyl, linear and branched $C_1-C_{10}$ haloalkyl, linear and branched, $C_2-C_{10}$ alkenyl, linear and branched $C_2-C_{10}$ alkynyl, $C_5-C_{12}$ cycloalkyl, $C_6-C_{12}$ aryl, and $C_7-C_{24}$ aralkyl; $R^6$ and $R^8$ together with the two ring carbon atoms to which they are attached can represent a cycloaliphatic group containing 4 to 12 carbon atoms or an aryl group containing 6 to 14 carbon atoms. The cycloalkyl, cycloaliphatic, aryl, and aryl groups set forth above can optionally be substituted with linear and branched $C_1-C_5$ alkyl, linear and branched $C_1-C_5$ haloalkyl, $C_5-C_{12}$ cycloalkyl, $C_6-C_{12}$ aryl, and halogen, preferably chlorine and fluorine.

When the pendant group(s) is a functional substituent, $R^5$ to $R^8$ independently represent a radical selected from $-(CH_2)_nC(O)OR^9$, $-(CH_2)_{n'''}C(O)OR^9$, $-(CH_2)_{n'''}OR^9$, $-(CH_2)_{n'''}OC(O)R^9$, $-(CH_2)_{n'''}C(O)R^9$, $-(CH_2)_{n'''}OC(O)OR^9$, and $-(CH_2)_{n'''}C(O)OR^{10}$, wherein n''' independently represents an integer from 0 to 10; $R^9$ independently represents hydrogen, linear and branched $C_1-C_{10}$ alkyl, linear and branched $C_1-C_{10}$ haloalkyl, linear and branched $C_2-C_{10}$ alkenyl, linear and branched $C_2-C_{10}$ alkynyl, substituted and unsubstituted $C_5-C_{12}$ cycloalkyl, substituted and unsubstituted $C_6-C_{14}$ aryl, and substituted and unsubstituted $C_7-C_{24}$ aralkyl; $R^{10}$ represents a moiety selected from $-C(CH_3)_3$, $-Si(CH_3)_3$, $-CH(R^{11})OCH_2CH_3$, $-CH(R^{11})OC(CH_3)_3$ or the following alicyclic and hetero cyclic groups:

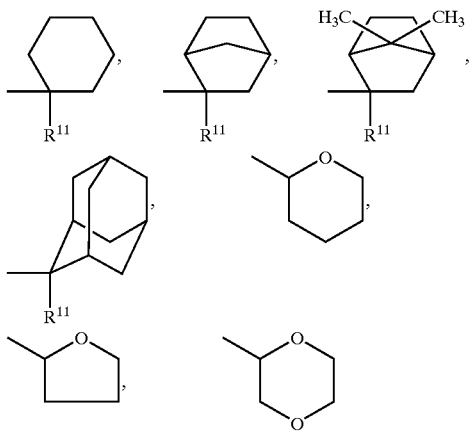

wherein $R^{11}$ represents hydrogen or a linear and branched $C_1-C_5$ alkyl group. The alkyl groups include methyl, ethyl, propyl, i-propyl, butyl, i-butyl, t-butyl, pentyl, t-pentyl and neopentyl. In the above structures, the single bond line projecting from the cyclic groups indicates the position where the cyclic protecting group is bonded to the acid substituent. Examples of $R^{10}$ radicals include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxyethyl. It is preferable that only two above defined functional substituents be present and most preferably only one.

The $R^{10}$ radical can also represent dicyclopropylmethyl (Dcpm), and dimethylcyclopropylmethyl (Dmcp) groups which are represented by the following structures:

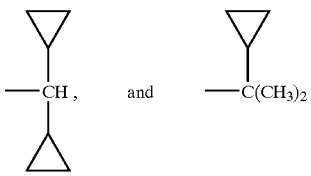

Other monomers that can be copolymerized with the norbornene-type monomers of Formula I are maleic anhydride, $SO_2$, CO, acrylate and methacrylate monomers represented by the formulae $CH_2=CHR^{12}C(O)OR^{10}$ and $CH_2=CHR^{12}C(O)OR^{13}$, wherein $R^{12}$ is hydrogen or methyl, $R^{13}$ is a sulfonamide group represented by

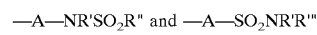

wherein $-A-$, R', R'', and R''' are as previously defined above, and $R^{10}$ is as defined above, and maleimides of the formula:

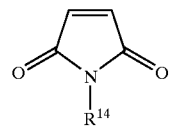

wherein $R^{14}$ represents hydrogen, linear and branched $C_1-C_{10}$ alkyl, substituted and unsubstituted cycloalkyl, and substituted and unsubstituted $C_6-C_{14}$ aryl.

Polymers

The polymers of the invention comprise repeating units polymerized from at least one monomer(s) of Formula I in optional combination with a monomer(s) selected from Formula II, maleic anhydride, sulfur dioxide ($SO_2$), carbon monoxide (CO), an acrylate monomer(s) defined above and combinations thereof.

The acrylate and methacrylate comonomers of this invention are represented by the formula $CH_2=CHR^8C(O)OR^9$, wherein $R^8$ is hydrogen or methyl and $R^9$ is selected from hydrogen, linear and branched ($C_1-C_{10}$) alkyl, linear and branched, ($C_2-C_{10}$) alkenyl, linear and branched ($C_2-C_{10}$) alkynyl, ($C_5-C_{12}$) cycloalkyl, ($C_6-C_{14}$) aryl, and ($C_7-C_{24}$) aralkyl. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, and decyl. Representative alkenyl groups include but are not limited to vinyl, and allyl. Representative alkynyl groups include ethynyl, 1-propynyl, 2-propynyl, 1-butynyl, and 2-butynyl. Representative cycloalkyl groups include but are not limited to cyclopentyl, cyclohexyl, and cyclooctyl substituents. Representative aryl groups include but are not limited to phenyl, naphthyl and anthracenyl. Representative aralkyl groups include but are not limited to benzyl, and phenethyl. As discussed above, the hydrocarbyl groups include halogenated and perhalogenated hydrocarbyl substituents. The preferred perhalohydrocarbyl groups include perhalogenated phenyl and alkyl groups. The alkyl groups are linear or branched and have the formula $C_z$—$X_{2Z+1}$ wherein X is a halogen and z is selected from an integer from 1 to 10. Preferably X is fluorine. Preferred perfluorinated substituents include perfluorophenyl, perfluoromethyl, perfluoroethyl, perfluoropropyl, and perfluobutyl. In addition to the halogen substituents, the cycloalkyl and aryl groups of the invention can be further substitued with linear and branched ($C_1$–$C_5$) alkyl and haloalkyl groups, aryl groups and cycloalkyl groups.

In the acrylate and methacrylate formulae above, $R^9$ also represents an acid labile moiety selected from —$C(CH_3)_3$, —$Si(CH_3)_3$, —$CH(R^7)OCH_2CH_3$, —$CH(R^7)OC(CH_3)_3$ or the following cyclic groups:

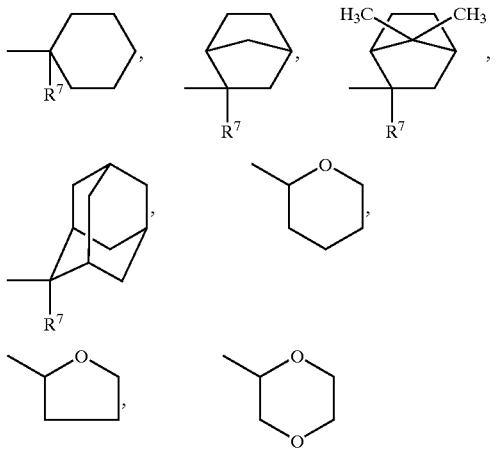

wherein $R^7$ is the same as defined above. Representative groups defined under $R^9$ include 1-methyl-1-cyclohexyl, isobornyl, 2-methyl-2-isobornyl, 2-methyl-2-adamantyl, tetrahydrofuranyl, tetrahydropyranoly, 3-oxocyclohexanonyl, mevalonic lactonyl, 1-ethoxyethyl, and 1-t-butoxy ethyl groups. $R^9$ can also represent the Dcpm and Dmcp groups defined above.

There are several routes to polymerize the NB sulfonamide monomers. These include: (1) ring-opening metathesis polymerization (ROMP); (2) ROMP followed by hydrogenation; and (3) addition polymerization. Each of the foregoing routes produces polymers with specific structures as shown in the diagram 1 below. The sulfonamide groups are present but are not indicated in the structures shown below.

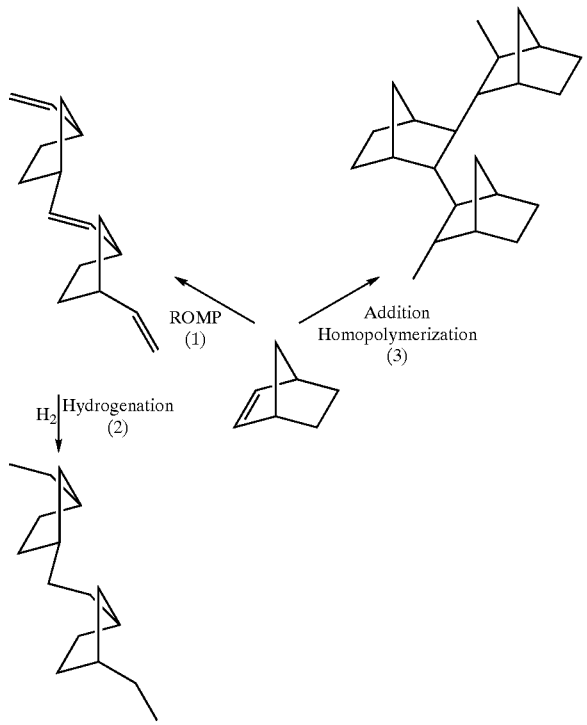

Diagram 1

A ROMP polymer has a different structure than that of an addition polymer. A ROMP polymer contains a repeat unit with one less cyclic unit than did the starting monomer. The repeat units are linked together in an unsaturated backbone as shown above. Because of this unsaturation the polymer preferably should subsequently be hydrogenated to confer oxidative stability to the backbone. Addition polymers on the other hand have no C=C unsaturation in the polymer backbone despite being formed from the same monomer.

The ROMP polymers of the present invention are polymerized in the presence of a metathesis ring-opening polymerization catalyst in an appropriate solvent. Methods of polymerizing via ROMP and the subsequent hydrogenation of the ring-opened polymers so obtained are disclosed in the U.S. Pat. Nos. 5,053,471 and 5,202,388 which are incorporated herein by reference. In these patents the monomers that are polymerized and the resulting polymers do not contain sulfonamide groups, but the methods disclosed there can be used to polymerize the NB sulfonamides.

In one ROMP embodiment the polycyclic monomers of the invention can be polymerized in the presence of a single component ruthenium or osmium metal carbene complex catalyst such as those disclosed in WO 95-US9655. The monomer to catalyst ratio employed should range from about 100:1 to about 2,000:1, with a preferred ratio of about 500:1. The reaction can be conducted in halohydrocarbon solvent such as dichlorethane, dichloromethane, chlorobenzene and the like or in a hydrocarbon solvent such as toluene. The amount of solvent employed in the reaction medium should be sufficient to achieve a solids content of about 5 to about 40 weight percent, with 6 to 25 weight percent solids to solvent being preferred. The reaction can be conducted at a temperature ranging from about 0° C. to about 60° C., with about 20° C. to 50° C. being preferred.

A preferred metal carbene catalyst is bis (tricyclohexylphosphine)benzylidene ruthenium. Surprisingly and advantageously, it has been found that this catalyst can be utilized as the initial ROMP reaction catalyst and as an efficient hydrogenation catalyst to afford an essentially saturated ROMP polymer. No additional hydrogenation catalyst need be employed. Following the initial ROMP reaction, all that is needed to effect the hydrogenation of the polymer backbone is to maintain hydrogen pressure over the reaction medium at a temperature above about 100° C. but lower than about 220° C., preferably between about 150 to about 200° C.

The NB sulfonamide monomers can also be homopolymerized or copolymerized with maleic anhydride or with sulfur dioxide ($SO_2$) or with maleic amhydride and an acrylate using a standard free radical initiator. Typical free radical initiators are peroxygen compounds and persulfates, particularly benzoyl peroxide, t-butyl diperphthalate, perargouyl peroxide, 1-hydroxycyclohexyl hydroperoxide and other hydroperoxides, dialkylperoxides and diacylperoxides; azo compounds such as azodiisobutyronitrile and dimenthylazodi-isobutyromitrile and other free radical initiators known in the art. Free radical polymerization techniques are set forth in the *Encyclopedia of Polymer Science*, John Wiley & Sons, 13, 708 (1988).

Useful solvents include, for example, alkanes such a n-pentane, n-hexane, n-heptane, n-octane, n-nonane and n-decane; cycloalkanes such as cyclohexane, cycloheptane, cyclooctane, decalin and norbornane; aromatic hydrocarbons such as benzene, toluene, xylene, ethylbenzene and cumene; halogenated hydrocarbons such as chlorobutane, bromohexane, dichloroethane, hexamethylene dibromide and chlorobenzene; and saturated carboxylic acid esters such as ethyl acetate, n-butyl acetate, I-butyl acetate, and methyl propionate, and tetrahydrofuran.

The norbornene monomers that are copolymerized with NB sulfonamides may contain acid-cleavable estere groups. Examples of such groups are a linear acetal group such as methoxymethyloxy, ethoxymethyloxy, n-propoxymethyloxy, isopropoxymethyloxy, n-butoxymethyloxy, t-butoxymethyloxy, phenaxymethloxy and trichloroethoxymethyloxy groups; a cyclic acetal group such as tetrahydrofuranyloxy and tetrahydropyranyloxy; a carbonate group such as isopropoxycarbonyloxy, 2-butenyloxycarbonyloxy, t-butoxycarbonyloxy, 1-methyl-2-propenyloxycarbonyloxy, cyclohexyloxycarbonloxy and 2-cyclohexenyloxycarbonyloxy groups; an orthocarbonate group such as trimethoxymethyloxy, triethaxymethyloxy, tri-n-propoxymethyloxy and methoxydiethoxymethyloxy; a (cyclo)alkyl ether such as methyl ether, ethyl ether, n-propyl ether, isopropyl ether, n-butyl ether, 2-methylpropyl ether, 1-methylrpopyl ether, t-butyl ether, cyclohexyl ether and t-butylcyclohexyl ether groups; an alkenyl ether such as allyl ether, 2-butenyl ether, 2-cyclohexenyl ether and 1-methyl-2-propenyl ether groups; an aralkyl ether such as benzyl ether and t-butyl benzyl ether groups; and an enol ether such as vinyl ether, 1-propenyl ether, 1-butenyl ether, 1,3-butadienyl ether and phenylvinyl ether. The ester groups may also be converted into a carboxyl group or a hydroxyl group.

Alternatively, and preferably, the monomers of this invention are polymerized in the presence of a single or multi-component catalyst system comprising a Group VIII metal ion source. The above described NB sulfonamide monomers may be addition homopolymerized or addition copolymerized with one or more other NB sulfonamide monomers or with one or more other above described monomers, such as non-sulfonamide containing norbornenes, acrylates or methacrylates, CO, or ethylene. Such addition polymerizations may be carried out in the presence of a single or multicomponent catalyst system comprising a group VIII metal ion source (preferably palladium or nickel). Surprisingly, it has been found that the addition polymers so produced possess excellent transparency to deep UV light (193 nm) and exhibit excellent resistance to reactive ion etching.

Single Component Systems

In one embodiment, the single component catalyst system of this invention comprises a Group VIII metal cation complex and a weakly coordinating counteranion as represented by the following formula:

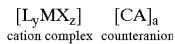

$$[L_yMX_z] \quad [CA]_a$$
$$\text{cation complex} \quad \text{counteranion}$$

wherein L represents a ligand containing 1, 2, or 3 π-bonds; M represents a Group VIII transition metal; X represents a ligand containing 1 σ-bond and between 0 to 3 π-bonds; y is 0, 1, or 2 and z is 0 or 1 and wherein y and z cannot both be 0 at the same time, and when y is 0, a is 2 and when y is 1, a is 1; and CA is a weakly coordinating counteranion.

The phrase "weakly coordinating counteranion" refers to an anion which is only weakly coordinated to the cation, thereby remaining sufficiently labile to be displaced by a neutral Lewis base. More specifically the phrase refers to an anion which when functioning as a stabilizing anion in the catalyst system of this invention does not transfer an anionic substituent or fragment thereof to the cation, thereby forming a neutral product. The counteranion is non-oxidative, non-reducing, non-nucleophilic, and relatively inert.

L is a neutral ligand that is weakly coordinated to the Group VIII metal cation complex. In other words, the ligand is relatively inert and is readily displaced from the metal cation complex by the inserting monomer in the growing polymer chain. Suitable π-bond containing ligands include ($C_2$ to $C_{12}$) monoolefinic (e.g., 2,3-dimethyl-2-butene), dioolefinic ($C_4$ to $C_{12}$) (e.g., norbornadiene) and ($C_6$ to $C_{20}$) aromatic moieties. Preferably ligand L is a chelating bidentate cyclo($C_6$ to $C_{12}$) diolefin, for example cyclooctadiene (COD) or dibenzo COD, or an aromatic compound such as benzene, toluene, or mesitylene.

Group VIII metal M is selected from Group VIII metals of the Periodic Table of the Elements. Preferably M is selected from the group consisting of nickel, palladium, cobalt, platinum, iron, and ruthenium. The most preferred metals are nickel and palladium.

Ligand X is selected from (i) a moiety that provides a single metal-carbon σ-bond (no π-bonds) to the metal in the cation complex or (ii) a moiety that provides a single metal carbon σ-bond and 1 to 3 π-bonds to the metal in the cation complex. Under embodiment (i) the moiety is bound to the Group VIII metal by a single metal-carbon σ-bond and no π-bonds. Representative ligands defined under this embodiment include ($C_1$ to $C_{10}$) alkyl moieties selected from methyl, ethyl, linear and branched moieties such as propyl, butyl, pentyl, neopentyl, hexyl, heptyl, octyl, nonyl and decyl and ($C_7$ to $C_{15}$) aralkyl such as benzyl. Under embodiment (ii) generally defined above, the cation has a hydrocarbyl group directly bound to the metal by a single metal-carbon σ-bond, and also by at least one, but no more than three π-bonds. By hydrocarbyl is meant a group that is capable of stabilizing the Group VIII metal cation complex by providing a carbon-metal σ-bond and one to three olefinic π-bonds that may be conjugated or non-conjugated. Representative hydrocarbyl groups are ($C_3$ to $C_{20}$) alkenyl which may be non-cyclic, monocyclic, or polycyclic and can be substituted with linear and branched ($C_1$ to $C_{20}$) alkoxy, ($C_6$ to $C_{15}$) aryloxy or halo groups (e.g., Cl and F).

Preferably X is a single allyl ligand, or, a canonical form thereof, which provides a σ-bond and a π-bond; or a compound providing at least one olefinic π-bond to the metal, and a σ-bond to the metal from a distal carbon atom, spaced apart from either olefinic carbon atom by at least two carbon-carbon single bonds (embodiment iii).

It should be readily apparent to those skilled in the art that when ligand L or X is absent (i.e., y or z is zero), the metal cation complex will be weakly ligated by the solvent in which the reaction was carried out. Representative solvents include, but are not limited to, halogenated aliphatic hydrocarbons such as carbon tetrachloride, chloroform, dichloromethane, 1,2-dichloroethane and aromatic solvents such as benzene, toluene, mesitylene, chlorobenzene, and nitrobenzene, and the like. A more detailed discussion on appropriate solvents will follow.

Selected embodiments of the Group VIII metal cation complexes of the single component catalyst systems of this invention are shown below.

Structure VII illustrates embodiment (i) wherein ligand X is a methyl group that is bound to the metal via a single metal-carbon σ-bond, and ligand L is COD that is weakly coordinated to the palladium metal via two olefinic π-bonds. In the structure below M preferably represents palladium or nickel.

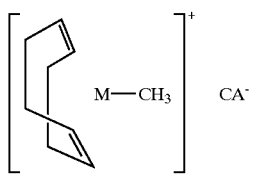

VII

Structures VIII, IX, and X illustrate various examples of embodiment (ii) wherein X is an allyl group that is bound to the metal (palladium is shown for illustrative purposes only) via a single metal-carbon π-bond and at least one but no more than three π-bonds.

In Structure VIII, L is not present but an aromatic group providing three π-bonds is weakly coordinated to the palladium metal; X is an allyl group providing a single metal-carbon π-bond and an olefinic π-bond to the palladium.

In Structure IX, L is COD and X is an allyl group providing a metal-carbon σ-bond and an olefinic π-bond to the palladium.

Structure X illustrates an embodiment wherein ligand X is an unsaturated hydrocarbon group that provides a metal-carbon σ-bond, a conjugated π-bond and two additional π-bonds to the palladium; L is absent.

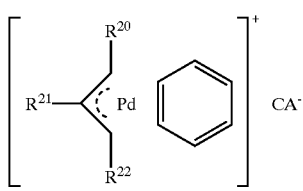

VIII

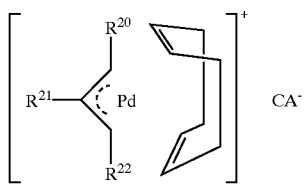

IX

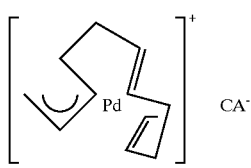

X

Substituents $R^{20}$, $R^{21}$, $R^{22}$ will be described in detail below.

Structures XI and XII illustrate examples of embodiment (iii) wherein L is COD and X is a ligand that provides at least one olefinic π-bond to the Group VIII metal and a σ-bond to the metal from a distal carbon atom, spaced apart from either olefinic carbon atom by at least two carbon-carbon single bonds.

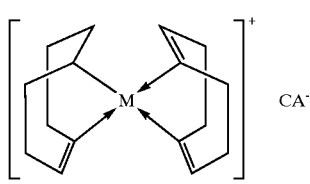

XI

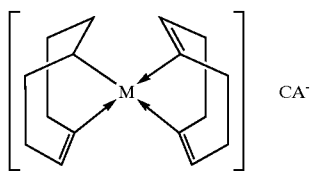

XI

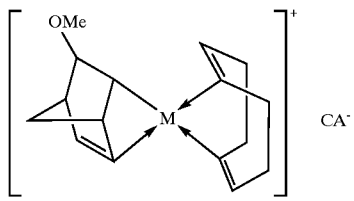

XII

The above-described Group VIII cation complexes are associated with a weakly coordinating or non-coordinating counteranion, CA⁻, which is relatively inert, a poor nucleophile and provides the cation complex with essential solubility in the reaction solvent. The key to proper anion design requires that it be labile, and stable and inert toward reactions with the cationic Group VIII metal complex in the final catalyst species and that it renders the single component catalyst soluble in the solvents of this invention. The anions which are stable toward reactions with water or Brønsted acids, and which do not have acidic protons located on the exterior of the anion (i.e., anionic complexes which do not react with strong acids or bases) possess the stability necessary to qualify as a stable anion for the catalyst system. The properties of the anion which are important for maximum lability include overall size, and shape (i.e., large radius of curvature), and nucleophilicity.

In general, a suitable anion may be any stable anion which allows the catalyst to be dissolved in a solvent of choice, and has the following attributes: (1) the anion should form stable salts with the aforementioned Lewis acid, Brønsted acids, reducible Lewis Acids, protonated Lewis bases, thallium and silver cations; (2) the negative charge on the anion should be delocalized over the framework of the anion or be localized within the core of the anion; (3) the anion should be a relatively poor nucleophile; and (4) the anion should not be a powerful reducing or oxidizing agent.

Anions that meet the foregoing criteria can be selected from the group consisting of a tetrafluoride of Ga, Al, or B; a hexafluoride of P, Sb, or As; perfluoro-acetates, propionates and butyrates, hydrated perchlorate; toluene sulfonates, and trifluoromethyl sulfonate; and substituted tetraphenyl borate wherein the phenyl ring is substituted with fluorine or trifluoromethyl moieties. Selected examples of counteranions include $BF_4^-$, $PF_6^-$, $AlF_3O_3SCF_3^-$, $SbF_6^-$, $SbF_5SO_3F^-$, $AsF_6^-$, trifluoroacetate ($CF_3CO_2^-$), pentafluoropropionate ($C_2F_5CO_2^-$), heptafluorobutyrate ($CF_3CF_2CF_2CO_2^-$), perchlorate ($ClO_4^-\cdot H_2O$), p-toluenesulfonate (p-$CH_3C_6H_4SO_3^-$) and tetraphenyl borates represented by the formula:

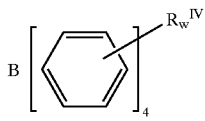

wherein $R^{IV}$ independently represents hydrogen, fluorine and trifluoromethyl and w is 1 to 5.

A preferred single component catalyst of the foregoing embodiment are represented by the formula:

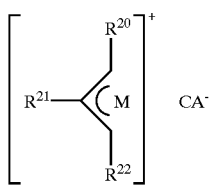

XIII

The catalyst comprises a -allyl Group VIII metal complex with a weakly coordinating counteranion. The allyl group of the metal cation complex is provided by a compound containing allylic functionality which functionality is bound to the M by a single carbon-metal -bond and an olefinic -bond. The Group VIII metal M is preferably selected from nickel and palladium with palladium being the most preferred metal. Surprisingly, it has been found that these single component catalysts wherein M is palladium and the cation complex is devoid of ligands other than the allyl functionality (i.e., $L_y=0$), exhibit excellent activity for the polymerization of functional polycyclic monomers such as the silyl containing monomers of this invention. As discussed above, it will be understood that the catalysts are solvated by the reaction diluent which diluent can be considered very weak ligands to the Group VIII metal in the cation complex.

Substituents $R^{20}$, $R^{21}$, and $R^{22}$ on the allyl group set forth above in Structures VIII, IX and XIII are each independently hydrogen, branched or unbranched ($C_1$ to $C_5$) alkyl such as methyl, ethyl, n-propyl, isopropyl, and t-butyl, ($C_6$ to $C_{14}$) aryl, such as phenyl and naphthyl, ($C_7$ to $C_{10}$) aralkyl such as benzyl, —$COOR'^{16}$, —$(CH_2)_nOR^{16}$, Cl and ($C_5$ to $C_6$) cycloaliphatic, wherein $R^{16}$ is ($C_1$ to $C_5$) alkyl, such as methyl, ethyl, n-propyl, isopropyl, n-butyl and i-butyl, and w is 1 to 5.

Optionally, any two of $R^{20}$, $R^{21}$, and $R^{22}$ may be linked together to form a cyclic- or multi-cyclic ring structure. The cyclic ring structure can be carbocyclic or heterocyclic. Preferably any two of $R^{20}$, $R^{21}$, and $R^{22}$ taken together with the carbon atoms to which they are attached form rings of 5 to 20 atoms. Representative heteroatoms include nitrogen, sulfur and carbonyl. Illustrative of the cyclic groups with allylic functionality are the following structures:

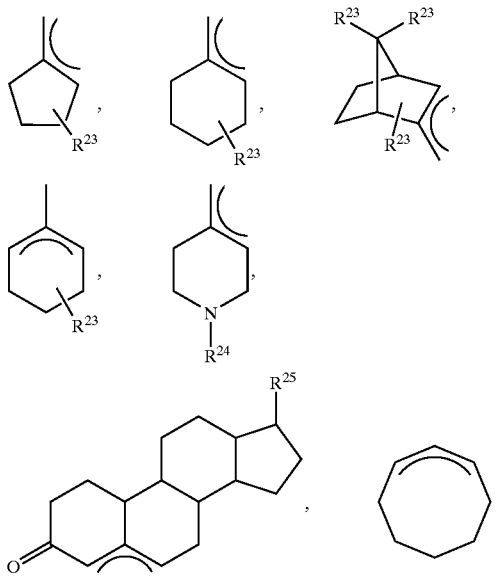

wherein $R^{23}$ is hydrogen, linear or branched ($C_1$ to $C_5$) alkyl such as methyl, ethyl, n-propyl, isopropyl, n-butyl, isobutyl, and pentyl, $R^{24}$ is methylcarbonyl, and $R^{25}$ is linear or branched ($C_1$ to $C_{20}$) alkyl. Counteranion $CA^-$ is defined as above.

Additional examples of -allyl metal complexes are found in R. G. Guy and B. L. Shaw, *Advances in Inorganic Chemistry and Radiochemistry*, Vol. 4, Academic Press Inc., New York, 1962; J. Birmingham, E. de Boer, M. L. H. Green, R. B. King, R. Köster, P. L. I. Nagy, G. N. Schrauzer, *Advances in Organometallic Chemistry*, Vol. 2, Academic Press Inc., New York, 1964; W. T. Dent, R. Long and A. J. Wilkinson, J. Chem. Soc., (1964) 1585; and H. C. Volger, Rec. Trav. Chim. Pay Bas, 88 (1969) 225; which are all hereby incorporated by reference.

The single component catalyst of the foregoing embodiment can be prepared by combining a ligated Group VIII metal halide component with a salt that provides the counteranion for the subsequently formed metal cation complex. The ligated Group VIII metal halide component, counteranion providing salt, and optional -bond containing component, e.g., COD, are combined in a solvent capable of solvating the formed single component catalyst. The solvent utilized is preferably the same solvent chosen for the reaction medium. The catalyst can be preformed in solvent or can be formed in situ in the reaction medium.

Suitable counteranion providing salts are any salts capable of providing the counteranions discussed above. For example, salts of sodium, lithium, potassium, silver, thallium, and ammonia, wherein the anion is selected from the counteranions ($CA^-$) defined previously. Illustrative counteranion providing salts include $TlPF_6$, $AgPF_6$, $AgSbF_6$, $LiBF_4$, $NH_4PF_6$, $KAsF_6$, $AgC_2F_5CO_2$, $AgBF_4 AgCF_3CO_2$, $AgClO_4H_2O$, $AgAsF_6$, $AgCF_3CF_2CF_2CO_2$, $AgC_2F_5CO_2$, $(C_4H_9)_4NB(C_6F_5)_4$, and

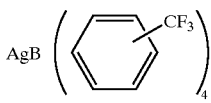

The specific catalyst: [allyl-Pd-COD]⁺ PF₆⁻ is preformed by forming a ligated palladium halide component, i.e., bis(allyl Pd bromide), which is then subjected to scission with a halide abstracting agent in the form of a counteranion providing salt, i.e., TlPF₆ in the presence of COD. The reaction sequence is written as follows:

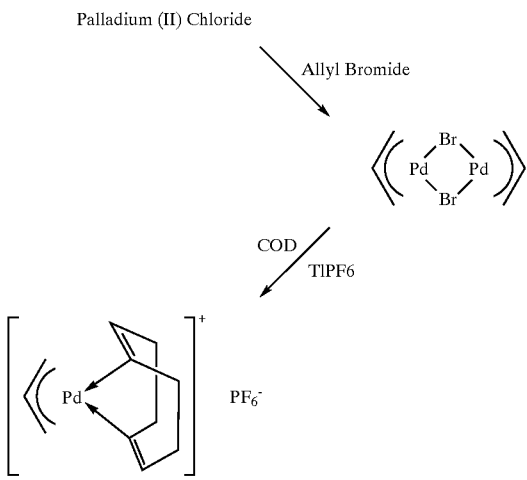

When partitioned, only one COD ligand remains, which is bonded by two -bonds to the palladium. The allyl functionality is bonded by one metal-carbon -bond and one -bond to the palladium.

For the preparation of the preferred -allyl Group VIII metal/counteranion single component catalysts represented in Structure XIII above, i.e., when M is palladium, allylpalladium chloride is combined with the desired counteranion providing salt, preferably silver salts of the counteranion, in an appropriate solvent. The chloride ligand comes off the allyl palladium complex as a precipitate of silver chloride (AgCl) which can be filtered out of the solution. The allylpalladium cation complex/counteranion single component catalyst remains in solution. The palladium metal is devoid of any ligands apart from the allylic functionality.

An alternative single component catalyst that is useful in the present invention is represented by the formula below:

$$Pd[R^{27}CN]_4[CA^-]_2$$

wherein $R^{27}$ independently represents linear and branched ($C_1$ to $C_{10}$) alkyl and $CA^-$ is a counteranion defined as above.

Another single component catalyst system useful in making polymers utilized in this invention is represented by the formula:

$$E_nNi(C_6F_5)_2$$

wherein n is 1 or 2 and E represents a neutral 2 electron donor ligand. When n is 1, E preferably is a -arene ligand such as toluene, benzene, and mesitylene. When n is 2, E is preferably selected from diethylether, tetrahrydrofuran (THF), and dioxane. The ratio of monomer to catalyst in the reaction medium can range from about 2000:1 to about 100:1. The reaction can be run in a hydrocarbon solvent such as cyclohexane, toluene, and the like at a temperature range from about 0° C. to about 70° C., preferably 10° C. to about 50° C., and more preferably from about 20° C. to about 40° C. Preferred catalysts of the above formula are (toluene)bis (perfluorophenyl) nickel, (mesitylene)bis(perfluorophenyl) nickel, (benzene)bis(perfluorophenyl) nickel, bis (tetrahydrofuran)bis(perfluorophenyl) nickel and bis (dioxane)bis(perfluorophenyl) nickel.

Multicomponent Systems

The multicomponent catalyst system embodiment of the present invention comprises a Group VIII metal ion source, in combination with one or both of an organometal cocatalyst and a third component. The cocatalyst is selected from organoaluminum compounds, dialkylaluminum hydrides, dialkyl zinc compounds, dialkyl magnesium compounds, and alkyllithium compounds.

The Group VIII metal ion source is preferably selected from a compound containing nickel, palladium, cobalt, iron, and ruthenium with nickel and palladium being most preferred. There are no restrictions on the Group VIII metal compound so long as it provides a source of catalytically active Group VIII metal ions. Preferably, the Group VIII metal compound is soluble or can be made to be soluble in the reaction medium.

The Group VIII metal compound comprises ionic and/or neutral ligand(s) bound to the Group VIII metal. The ionic and neutral ligands can be selected from a variety of monodentate, bidentate, or multidentate moieties and combinations thereof.

Representative of the ionic ligands that can be bonded to the metal to form the Group VIII compound are anionic ligands selected from the halides such as chloride, bromide, iodide or fluoride ions; pseudohalides such as cyanide, cyanate, thiocyanate, hydride; carbanions such as branched and unbranched ($C_1$ to $C_{40}$) alkylanions, phenyl anions; cyclopentadienylide anions; -allyl groupings; enolates of -dicarbonyl compounds such as acetylacetonate (4-pentanedionate), 2,2,6,6-tetramethyl-3,5-heptanedionate, and halogenated acetylacetonoates such as 1,1,1,5,5,5-hexafluoro-2,4-pentanedionate, 1,1,1-trifluoro-2,4, pentanedionate; anions of acidic oxides of carbon such as carboxylates and halogenated carboxylates (e.g., acetates, 2-ethylhexanoate, neodecanoate, trifluoroacetate, etc.) and oxides of nitrogen (e.g., nitrates, nitrites, etc.) of bismuth (e.g., bismuthate, etc.), of aluminum (e.g., aluminates, etc.), of silicon (e.g., silicate, etc.), of phosphorous (e.g., phosphates, phosphites, phosphines, etc.) of sulfur (e.g., sulfates such as triflate, p-toluene sulfonate, sulfites, etc.); ylides; amides; imides; oxides; phosphides; sulfides; ($C_6$ to $C_{24}$) aryloxides, ($C_1$ to $C_{20}$) alkoxides, hydroxide, hydroxy ($C_1$ to $C_{20}$) alkyl; catechols; oxalate; chelating alkoxides and aryloxides. Palladium compounds can also contain complex anions such as $PF^-_6$, $AlF_3O_3SCF^-_3$, $SbF^-_6$ and compounds represented by the formulae:

$$Al(R''')^-_4, B(X)^-_4$$

wherein R''' and X independently represent a halogen atom selected from Cl, F, I, and Br, or a substituted or unsubstituted hydrocarbyl group. Representative of hydrocarbyl are ($C_1$ to $C_{25}$) alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonodecyl, eicosyl, heneicosyl, docosyl, tricosyl, tetracosyl, pentacosyl, and isomeric forms thereof; ($C_2$ to $C_{25}$) alkenyl such as vinyl, allyl, crotyl, butenyl, pentenyl, hexenyl, octenyl, nonenyl, decenyl, undecenyl, dodecenyl, tridecenyl, tetradecenyl pentadecenyl, hexadecenyl, heptadecenyl, octadecenyl, nonadecenyl, pentacosenyl, and isomeric forms thereof. ($C_6$ to $C_{25}$) aryl such as phenyl, tolyl, xylyl, naphthyl, and the like; ($C_7$ to $C_{25}$) aralkyl such as benzyl, phenethyl, phenpropyl, phenbutyl, phenhexyl, napthoctyl, and the like; ($C_3$ to $C_8$) cycloalkyl such as cyclopropyl, cyclobutyl, cyclopentyl, cyclohexyl, cycloheptyl, cyclooctyl, 2-norbornyl, 2-norbornenyl, and the like. In addition to the above definitions X represents the radical:

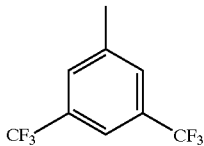

The term "substituted hydrocarbyl" means the hydrocarbyl group as previously defined wherein one or more hydrogen atoms have been replaced with a halogen atom such as Cl, F, Br, and I (e.g., as in the perfluorophenyl radical); hydroxyl; amino; alkyl; nitro; mercapto; and the like.

The Group VIII metal compounds can also contain cations such as, for example, organoammonium, organoarsonium, organophosphonium, and pyridinium compounds represented by the formulae:

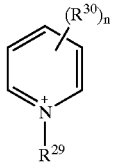

wherein A represents nitrogen, arsenic, and phosphorous and the $R^{28}$ radical can be independently selected from hydrogen, branched or unbranched ($C_1$ to $C_{10}$) alkyl, branched or unbranched ($C_2$ to $C_{20}$) alkenyl, and ($C_5$ to $C_{16}$) cycloalkyl, e.g., cyclopentyl, cyclohexyl, cycloheptyl, cyclooctyl, and the like. $R^{29}$ and $R^{30}$ are independently selected from hydrogen, branched and unbranched ($C_1$ to $C_{50}$) alkyl, linear and branched ($C_2$ to $C_{50}$) alkenyl and ($C_5$ to $C_{16}$) cycloalkyl groups as defined above; and n is 1 to 5, preferably n is 1, 2, or 3, most preferably n is 1. The $R^{30}$ radicals preferably are attached to positions 3, 4, and 5 on the pyridine ring.

It should be noted that increasing the sum of the carbon atoms contained in the $R^{28}$ radicals confers better solubility of the transition metal compound in organic media such as organic solvents and polycyclic the monomer. Preferably, the $R^{28}$ radicals are selected from ($C_1$ to $C_{18}$) alkyl groups wherein the sum of carbon atoms for all $R^{28}$ radicals is 15 to 72, preferably 25 to 48, more preferably 21 to 42. The $R^{21}$ radical is preferably selected from linear and branched ($C_1$ to $C_{50}$) alkyl, more preferably ($C_{10}$ to $C_{40}$) alkyl. $R^{30}$ is preferably selected from linear and branched ($C_1$ to $C_{40}$) alkyl, more preferably ($C_2$ to $C_{30}$) alkyl.

Specific examples of organoanumonium cations include tridodecylammonium, methyltricaprylammonium, tris(tridecyl)ammonium and trioctylammonium. Specific examples of organoarsonium and organophosphonium cations include tridodecylarsonium and phosphonium, methyltricaprylarsonium and phosphonium, tris(tridecyl)arsonium and phosphonium, and trioctylarsonium and phosphonium.

Specific pyridinium cations include eicosyl-4-(1-butylpentyl)pyridinium, docosyl-4-(13-pentacosyl)pyridinium, and eicosyl-4-(1-butylpentyl)pyridinium.

Suitable neutral ligands which can be bonded to the palladium transition metal are the olefins; the acetylenes; carbon monoxide; nitric oxide, nitrogen compounds such as ammonia, alkylisocyanide, alkylisocyanate, alkylisothiocyanate; pyridines and pyridine derivatives (e.g., 1,10-phenanthroline, 2,2'-dipyridyl), 1,4-dialkyl-1,3-diazabutadienes, 1,4-diaryl-1,3-diazabutadienes and amines such as represented by the formulae:

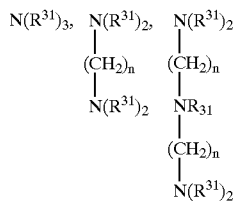

wherein $R^{31}$ is independently hydrocarbyl or substituted hydrocarbyl as previously defined and n is 2 to 10. Ureas; nitriles such as acetonitrile, benzonitrile and halogenated derivatives thereof; organic ethers such as dimethyl ether of diethylene glycol, dioxane, tetrahrydrofuran, furan diallyl ether, diethyl ether, cyclic ethers such as diethylene glycol cyclic oligomers; organic sulfides such as thioethers (diethyl sulfide); arsines; stibines; phosphines such as triarylphosphines (e.g., triphenylphosphine), trialkylphosphines (e.g., trimethyl, triethyl, tripropyl, tripentacosyl, and halogenated derivatives thereof), bis(diphenylphosphino)ethane, bis(diphenylphosphino)propane, bis(dimethylphosphino)propane, bis(diphenylphosphino)butane, (S)-(−)2,2'-bis(diphenylphosphino)-1,1'-binaphthyl, (R)-(+)-2,2'-bis(diphenylphosphino)-1,1'-binaphthyl, and bis(2-diphenylphosphinoethyl)phenylphosphine; phosphine oxides, phosphorus halides; phosphites represented by the formula:

wherein $R^{31}$ independently represents a hydrocarbyl or substituted hydrocarbyl as previously defined; phosphorus oxyhalides; phosphonates; phosphonites, phosphinites, ketones; sulfoxides such as ($C_1$ to $C_{20}$) alkylsulfoxides; ($C_6$ to $C_{20}$) arylsulfoxides, ($C_7$ to $C_{40}$) alkarylsulfoxides, and the like. It should be recognized that the foregoing neutral ligands can be utilized as optional third components as will be described hereinbelow.

Examples of Group VIII transition metal compounds suitable as the Group VIII metal ion source include: palladium ethylhexanoate, trans-Pd $Cl_2(PPh_3)_2$, palladium (II) bis(trifluoroacetate), palladium (II) bis(acetylacetonate), palladium (II) 2-ethylhexanoate, Pd(acetate)$_2$(PPh$_3$)$_2$, palladium (II) bromide, palladium (II) chloride, palladium (II) iodide, palladium (II) oxide, monoacetonitriletris(triphenylphosphine) palladium (II) tetrafluoroborate, tetrakis(acetonitrile) palladium (II) tetrafluoroborate, dichlorobis(acetonitrile) palladium (II), dichlorobis(triphenylphosphine) palladium (II), dichlorobis(benzonitrile) palladium (II), palladium acetylacetonate, palladium bis(acetonitrile) dichloride, palladium bis(dimethylsulfoxide) dichloride, nickel acetylacetonates, nickel carboxylates, nickel dimethylglyoxime, nickel ethylhexanoate, $NiCl_2(PPh_3)_2$, $NiCl_2(PPh_2CH_2)_2$, (P(cyclohexyl)$_3$)H Ni(Ph$_2$P(C$_6$H$_4$)CO$_2$), (PPh$_3$) (C$_6$H$_5$)Ni (Ph$_2$PCH=C(O)Ph), bis(2,2,6,6-tetramethyl-3,5- heptanedionate) nickel (II), nickel (II) hexafluoroacetylacetonate tetrahrydrate, nickel (II) trifluoroacetylacetonate dihydrate, nickel (II) acetylacetonate tetrahrydrate, nickelocene, nickel (II) acetate, nickel bromide, nickel chloride, dichlorohexyl nickel acetate, nickel lactate, nickel oxide, nickel tetrafluoroborate, bis(allyl)nickel, bis(cyclopentadienyl)nickel, cobalt neodecanoate, cobalt (II) acetate, cobalt (II) acetylacetonate, cobalt (III) acetylacetonate, cobalt (II) benzoate, cobalt chloride, cobalt bromide, dichlorohexyl cobalt acetates, cobalt (II) stearate, cobalt (II) tetrafluoroborate, iron napthenate, iron (II) chloride, iron (III) chloride, iron (II) bromide, iron (III) bromide, iron (II) acetate, iron (III) acetylacetonate, ferrocene, ruthenium tris(triphenylphosphine) dichloride, ruthenium tris(triphenylphosphine) hydrido chloride, ruthenium trichloride, ruthenium tetrakis(acetonitrile) dichloride, ruthenium tetrakis(dimethylsulfoxide) dichloride, rhodium chloride, rhodium tris(triphenylphosphine) trichloride.

The organoaluminum component of the multicomponent catalyst system of the present invention is represented by the formula:

$$AlR^{32}_{3-x}Q_x$$

wherein $R^{32}$ independently represents linear and branched ($C_1$ to $C_{20}$) alkyl, ($C_6$ to $C_{24}$) aryl, ($C_7$ to $C_{20}$) aralkyl, ($C_3$ to $C_{10}$) cycloalkyl; Q is a halide or pseudohalide selected from chlorine, fluorine, bromine, iodine, linear and branched ($C_1$ to $C_{20}$) alkoxy, ($C_6$ to $C_{24}$) aryloxy; and x is 0 to 2.5, preferably 0 to 2.

Representative organoaluminum compounds include trialkylaluminums such as trimethylaluminum, triethylaluminum, tripropylaluminum, triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, trioctylaluminum, tris-2-norbornylaluminum, and the like; dialkylaluminum halides such as dimethylaluminum chloride, diethylaluminum chloride, diisopropylaluminum chloride, diisobutylaluminum chloride, and the like; monoalkylaluminum dihalides such as methylaluminum dichloride, ethylaluminum dichloride, ethylaluminum diiodide, propylaluminum dichloride, isopropylaluminum dichloride, butylaluminum dichloride, isobutylaluminum dichloride, and the like; and alkylaluminum sesquihalides such as methylaluminum sesquichloride, ethylaluminum sesquichloride, propylaluminum sesquichloride, isobutylaluminum sesquichloride, and the like.

The dialkylaluminum hydride is selected from linear and branched ($C_1$ to $C_{10}$) dialkylaluminum hydride, with diisobutylaluminum hydride being a preferred dialkylaluminum hydride compound.

The dialkyl zinc compounds are selected from linear and branched ($C_1$ to $C_{10}$) dialkyl zinc compounds with diethyl zinc being preferred. The dialkyl magnesium compounds are selected from linear and branched ($C_1$ to $C_{10}$) dialkyl magnesium with dibutyl magnesium being the most preferred. The alkyl lithiums are selected from linear and branched ($C_1$ to $C_{10}$) alkyl lithium compounds. Butyllithium is the preferred alkyl lithium.

In the practice of the present invention, the catalytic system obtained from the Group VIII metal ion source is utilized with one or both of a component selected from the group of cocatalyst compounds, and third component compounds.

Examples of third components are Lewis acids such as the $BF_3$.etherate, $TiCl_4$, $SbF_5$, tris(perfluorophenyl)boron, $BCl_3$, $B(OCH_2CH_3)_3$; strong Brønsted acids such as hexafluoroantimonic acid ($HSbF_6$), $HPF_6$ hydrate, trifluoroacetic acid ($CF_3CO_2H$), and $FSO_3H.SbF_5$, $H_2C(SO_2CF_3)_2CF_3SO_3H$, and paratoluenesulfonic acid; halogenated compounds such as hexachloroacetone, hexafluoroacetone, 3-butenoic acid-2,2,3,4,4-pentachlorobutylester, hexafluoroglutaric acid, hexafluoroisopropanol, and chloranil, i.e.,

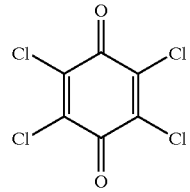

electron donors such as phosphines and phosphites and olefinic electron donors selected from ($C_4$ to $C_{12}$) aliphatic and ($C_6$ to $C_{12}$) cycloaliphatic diolefins, such as butadiene, cyclooctadiene, and norbornadiene.

Acidity of strong Brønsted acids can be gauged by determining their Hammett acidity function $H_0$. A definition of the Hammett acidity function is found in *Advanced Inorganic Chemistry* by F. A. Cotton and G. Wilkinson, Wiley-Interscience, 1988, p. 107.

As set forth above the neutral ligands can be employed as optional third components with electron donating properties.

In one embodiment of the invention, the multicomponent catalyst system can be prepared by a process which comprises mixing the catalyst components, i.e., the Group VIII metal compound, the cocatalyst compound, and third component (if employed), together in a hydrocarbon or halohydrocarbon solvent and then mixing the premixed catalyst system in the reaction medium comprising at least one silyl functional polycyclic monomer. Alternatively, (assuming the optional third component is utilized), any two of the catalyst system components can be premixed in a hydrocarbon or halohydrocarbon solvent and then introduced into the reaction medium. The remaining catalyst component can be added to the reaction medium before or after the addition of the premixed components.

In another embodiment, the multicomponent catalyst system can be prepared in situ by mixing together all of the catalyst components in the reaction medium. The order of addition is not important.

In one embodiment of the multicomponent catalyst system of the present invention, a typical catalyst system comprises a Group VIII transition metal salt, e.g., nickel ethylhexanoate, an organoaluminum compound, e.g., triethylaluminum, and a mixture of third components, e.g., $BF_3$.etherate and hexafluoroantimonic acid ($HSbF_6$), in a preferred molar ratio of Al/$BF_3$.etherate/Ni/acid of 10/9/1/0.5-2. The reaction scheme is written as follows:

nickel ethylhexanoate+$HSbF_6$+9$BF_3$.etherate+10 triethylaluminum→Active Catalyst     1.

In another embodiment of the multicomponent catalyst system of the invention, the catalyst system comprises a nickel salt, e.g., nickel ethylhexanoate, an organoaluminum compound, e.g., triethylaluminum, and a third component Lewis acid, e.g., tris(perfluorophenyl)boron as shown in the following scheme:

nickel ethylhexanoate+tris(perfluorophenyl)boron+triethylaluminum→Active Catalyst     2.

In another embodiment of the multicomponent catalyst system of the invention the third component is a halogenated compound selected from various halogenated activators. A typical catalyst system comprises a Group VIII transition metal salt, an organoaluminum, and a third component halogenated compound as shown below:

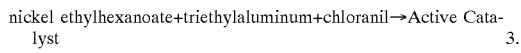

nickel ethylhexanoate+triethylaluminum+chloranil→Active Catalyst   3.

In still another embodiment of the multicomponent catalyst system of this invention no cocatalyst is present. The catalyst system comprises a Group VIII metal salt (e.g. 3-allylnickelbromide dimer and a Lewis acid (e.g. tris (perfluorophenyl)boron as shown below:

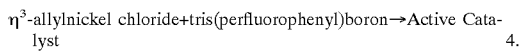

$\eta^3$-allylnickel chloride+tris(perfluorophenyl)boron→Active Catalyst   4.

We have found that the choice of Group VIII metal in the metal cation complex of both the single and multicomponent catalyst systems of this invention influences the microstructure and physical properties of the polymers obtained. For example, we have observed that palladium catalysts typically afford norbornene units which are exclusively 2,3 enchained and showing some degree of tacticity. The polymers catalyzed by the type 2 catalyst systems and the single component catalyst systems of the formula $E_nNi(C_6F_5)_2$ described above contain a perfluorophenyl group at least one of the two terminal ends of the polymer chain. In other words, a perfluorophenyl moiety can be located at one or both terminal ends of the polymer. In either case the perfluorophenyl group is covalently bonded to and pendant from a terminal polycyclic repeating unit of the polymer backbone.

Reactions utilizing the single and multicomponent catalysts of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, chlorobenzene, o-dichlorobenzene, toluene, and xylenes; halogenated (polar) hydrocarbons such as methylene chloride, chloroform, carbon tetrachloride, ethyl chloride, 1,1-dichloroethane, 1,2-dichloroethane, 1,2-dichloroethylene, 1-chloropropane, 2-chloropropane, 1-chlorobutane 2-chlorobutane, 1-chloro-2-methylpropane, and 1-chloropentane.

The choice of reaction solvent is made on the basis of a number of factors including the choice of catalyst and whether it is desired to run the polymerization as a slurry or solution process. For most of the catalysts described in this invention, the preferred solvents are chlorinated hydrocarbons such as methylene chloride and 1,2-dichloroethane and aromatic hydrocarbons such as chlorobenzene and nitrobenzene, with simple hydrocarbons being less preferred due to the resulting lower conversion of the functional NB-type monomer(s). Surprisingly we have discovered that certain of the catalyst systems, most notably the multicomponent catalysts based on Group VIII metal compounds and alkylaluminum halides, specifically, monoalkylaluminum dihalides, (e.g., ethylaluminum dichloride), and the type 2 catalysts referred to above also give excellent results (and high monomer conversion) when run in simple hydrocarbons such as heptane, cyclohexane, and toluene.

The molar ratio of total monomer to Group VIII metal for the single and multicomponent catalysts can run from 20:1 to 100,000:1, preferably 50:1 to 20,000:1, and most preferably 100:1 to 10,000:1.

In the multicomponent catalyst systems, the cocatalyst metal (e.g., aluminum, zinc, magnesium, and lithium) to Group VIII metal molar ratio ranges from less than or equal to 100:1, preferably less than or equal to 30:1, and most preferably less than or equal to 20:1.

The third component is employed in a molar ratio to Group VIII metal ranging from 0.25:1 to 20:1. When acids are employed as third components, the acid to Group VIII metal range is less than or equal to 4:1, preferably less than or equal to 2:1.

The temperature at which the polymerization reactions of the present invention are carried out typically ranges from $-100°$ C. to $120°$ C., preferably $-60°$ C. to $90°$ C., and most preferably $-10°$ C. to $80°$ C.

The optimum temperature for the present invention is dependent on a number of variables, primarily the choice of catalyst and the choice of reaction diluent. Thus, for any given polymerization the optimum temperature will be experimentally determined taking these variables into account. In the course of developing these catalyst and polymer systems we have observed that the palladium-carbon bond which links the palladium catalysts to the growing polymer chain is particularly stable. This is a major benefit in polymerizing polycyclic monomers bearing acid labile groups, esters and carboxylic acid functionalities since the palladium catalysts are extremely tolerant to such functionalities. However, this stability also makes it very difficult to remove the palladium catalyst residues from the resulting polymer. During the development of these new compositions, we discovered that the palladium-carbon bond can be conveniently cleaved (resulting in precipitation of palladium metal which can be removed by filtration or centrifugation) using carbon monoxide, preferably in the presence of a protic solvent such as an alcohol, moisture, or a carboxylic acid.

The polymers obtained by the process of the present invention are produced in a molecular weight ($M_n$) range from about 1,000 to about 1,000,000, preferably from about 2,000 to about 700,000, and more preferably from about 5,000 to about 500,000 and most preferably from about 10,000 to about 50,000.

Molecular weight can be controlled by changing the catalyst to monomer ratio, i.e., by changing the initiator to monomer ratio. Lower molecular weight polymers and oligomers may also be formed in the range from about 500 to about 500,000 by carrying out the polymerization in the presence of a chain transfer agent. Macromonomers or oligomers comprising from 4 to 50 repeating units can be prepared in the presence of a CTA (Chain Transfer Agent) selected from a compound having a terminal olefinic double bond between adjacent carbon atoms, wherein at least one of the adjacent carbon atoms has two hydrogen atoms attached thereto. The CTA is exclusive of styrenes (non-styrenes), vinyl ethers (non-vinyl ether) and conjugated dienes. By non-styrenic, non-vinyl ether is meant that compounds having the following structures are excluded from the chain transfer agents of this invention:

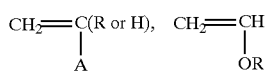

wherein A is an aromatic substituent and R is hydrocarbyl.

The preferred CTA compounds of this invention are represented by the following formula:

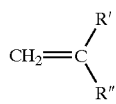

wherein R' and R" independently represent hydrogen, branched or unbranched ($C_1$ to $C_{40}$) alkyl, branched or unbranched ($C_2$ to $C_{40}$) alkenyl, and halogen.

Of the above chain transfer agents the olefins having 2 to 10 carbon atoms are preferred, e.g., ethylene, propylene, 4-methyl-1-pentene, 1-hexene, 1-decene, 1,7-octadiene, and 1,6-octadiene, or isobutylene.

While the optimum conditions for any given result should be experimentally determined by a skilled artisan taking into the account all of the above factors there are a number of general guidelines which can be conveniently utilized where appropriate. We have learned that, in general, -olefins (e.g., ethylene, propylene, 1-hexene, 1-decene, 4-methyl-1-pentene) are the most effective chain transfer agents with 1,1-disubstituted olefins (e.g., isobutylene) being less efficient. In other words, all other things being equal, the concentration of isobutylene required to achieve a given molecular weight will be much higher than if ethylene were chosen. Styrenic olefins, conjugated dienes, and vinyl ethers are not effective as chain transfer agents due to their propensity to polymerize with the catalysts described herein.

The CTA can be employed in an amount ranging from about 0.10 mole % to over 50 mole % relative to the moles of total NB-type monomer. Preferably, the CTA is employed in the range of 0.10 to 10 mole %, and more preferably from 0.1 to 5.0 mole %. As discussed above, depending on catalyst type and sensitivities, CTA efficiencies and desired end group, the concentration of CTA can be in excess of 50 mole % (based on total NB-functional monomer present), e.g., 60 to 80 mole %. Higher concentrations of CTA (e.g., greater than 100 mole %) may be necessary to achieve the low molecular weight embodiments of this invention such as in oligomer and macromonomer applications. It is important and surprising to note that even such high concentrations the CTA's (with the exception of isobutylene) do not copolymerize into the polymer backbone but rather insert as terminal end-groups on each polymer chain. Besides chain transfer, the process of the present invention affords a way by which a terminal -olefinic end group can be placed at the end of a polymer chain.

Polymers of the present invention that are prepared in the presence of the instant CTA's have molecular weights ($M_n$) ranging from about 1,000 to about 500,000, preferably from about 2,000 to about 300,000, and most preferably from about 5,000 to about 200,000.

EXAMPLES

Synthesis of Monomers

Example 1

Synthesis of Norbornene Sulfonylfluoride

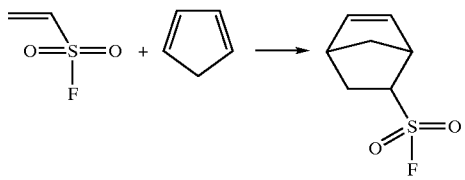

To 20.00 g (0.018 mol) of vinylsulfonyl fluoride in 40 ml of anhydrous ether was added 16.00 g (0.24 mol) of freshly prepared cyclopentadiene. The reaction was carried out for 20 min at 0° C. and then allowed to warm up to room temperature. After 24 hours., ether was distilled out at a normal pressure and the residue was distilled under reduced pressure to give a colorless oil (bp=97–99° C./15 torr) in 92% yield. The product was identified by $^1$H and $^{13}$C NMR and IR spectroscopy.

Example 2

Synthesis of Norbornene Sulfonamide

The sulfonyl fluoride 8.64 g, (0.043 mol.) and 60 mg of $NH_4Cl$ were replaced in a 250 ml steel autoclave, which was evacuated and purged with Ar three times.

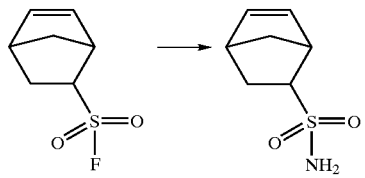

Ammonia 35.0 g., (2.06 mol) was introduced into the autoclave at room temperature and the reaction was carried out at room temperature for 36 hrs. The white solid crude product was dissolved in $CH_2Cl_2$ and washed with water. The water phase was extracted with $CH_2Cl_2$ and the organic phase was combined. Evaporation of $CH_2Cl_2$ gave 8.5 g. of the product, which was recrystallized from chloroform to give 88% Yield. Mpt.=106–108° C. The product was identified by $^1$H and $^{13}$C NMR and IR spectroscopy.

Example 3

Synthesis of Norbornene Amine

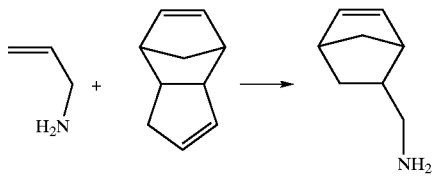

Into a clean dry 2 gallon high-pressure autoclave was placed 3.62 Kg (63.45 mol.) of Allyl Amine and 2.73 Kg (20.07 mol.) of dicyclopentadiene (DCPD) in an amine to DCPD ratio of 3:1. The reactor was purged with nitrogen and slowly heated to a temperature of 190° C. The internal pressure was observed to increase with the increase in temperature to a maximum of 280 psi. The reaction temperature was maintained at 190° C., for 5 hours at which point the internal pressure was observed to drop and remain constant at 210 psi. After 5 hours the reactor was cooled to room temperature and the crude reaction product was drawn out of the reactor. The product was purified from crude mixture via fractional distillation using a 1.5" internal diameter distillation column, at a head temperature of 66° C. with an overhead pressure of 13 torr, to give pure norbornyl amine. The purity of the product was confirmed using gas chromatography. The product was identified by $^1$H and 13C NMR and IR spectroscopy.

Example 4

Synthesis of N-(bicyclo(2.2.1)hept-5-ene-2-ylmethyl)-methanesulfonamide

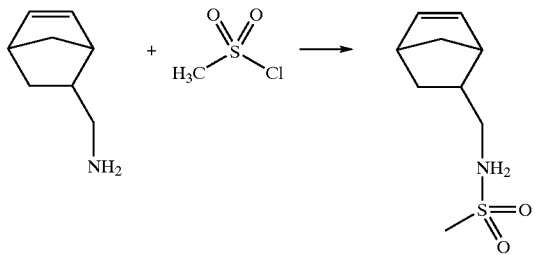

Into a dry 500 ml round bottom flask equipped with a magnetic stirrer, condenser and an addition funnel was added 75 ml of dry distilled tetrahydrofuran, 32 g (0.41 moles) of pyridine and 50 g (0.41 moles) of norbornyl amine. The reaction mixture was cooled to 0° C. To the mixture was added via the additional funnel 47 g (0.41 moles) of methanesulfonyl chloride and the reaction mixture was stirred overnight. The reaction mixture was filtered to remove the pyridinium hydrochloride salt and the filtrate was rotovaped to remove tetrahydrofuran, resulting in a solid. The solid was dissolved in diethylether, and the resulting solution was extracted several times with deionized water. After treating with decolorizing carbon and drying over anhydrous sodium sulfate, the solution was filtered and the solvent was removed by rotary evaporation. The solid product was recrystallized from toluene and dried under reduced pressure in 76% yield, mp 60–62° C. The product was identified by $^1$H and $^{13}$C NMR and IR spectroscopy.

Example 5

Synthesis of N-(bicyclo(2.2.1)hept-5-ene-2-ylmethyl)ethanesulfonamide

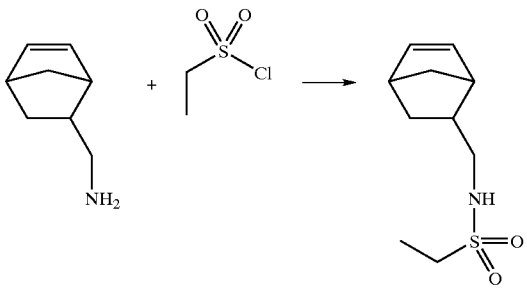

An oven-dried, nitrogen-flushed 1 L round bottom flask equipped with an addition funnel, nitrogen inlet, reagent inlet, and a teflon-coated stir bar was charged with 116.3 g 5-aminomethylnorbornene (0.944 mol,) 95.5 g triethylamine (0.944 mol,) and 1 L dichloromethane. The addition funnel was charged with 121.4 g ethanesulfonyl chloride (0.944 mol,) and 500 ml dichloromethane. The contents of the addition funnel were added dropwise to the flask over the course of approx. two hours. During this time, the reaction warmed gradually and finally began a gentle reflux. The reaction was left to stir for approx. 24 hours. The mixture was transferred into a separatory funnel, and the organic layer was washed twice with 300 ml water, 2× with 300 mL dilute sodium bicarbonate, and twice more with 300 ml water. The organic layer was dried over magnesium sulfate, then concentrated to yield an oil. Attempts to crystallize the oil from hexane:ethyl acetate failed. Silica gel column chromatography using hexane:ethyl acetate (60:40) as the eluent gave a clear, straw-colored oil that was further purified by vacuum distillation (140° C. at 5 microns of Hg) to provide 170 g of the desired ethanesulfonamide as a mixture of isomers. The product was identified by $^1$H and $^{13}$C NMR and IR spectroscopy.

Example 6

Synthesis of N-(bicyclo(2.2.1)hept-5-ene-2-ylmethyl)-propylsulfonamide

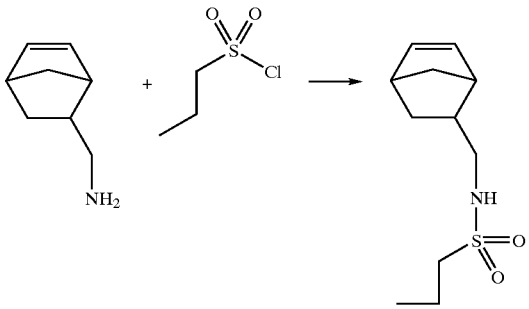

Into a dry 1 lit. round bottom flask equipped with a magnetic stirrer, condenser and an addition funnel was added 500 ml of dry distilled tetrahydrofuran, 63 g (0.51 moles) of norbornyl amine and 125 ml (0.41 moles) of triethylamine. The reaction mixture was cooled to 0° C. To the mixture was added via the additional funnel 65 g (0.495 moles) of propanesulfonyl chloride and the reaction mixture was stirred overnight. The reaction mixture was filtered to remove the triethylammonium hydrochloride salt and the filtrate was rotovaped to remove tetrahydrofuran, resulting in an solid. The solid was dissolved in diethylether, and the resulting solution was extracted several times with deionized water. After treating with decolorizing carbon and drying over anhydrous sodium sulfate, the solution was filtered and the solvent was removed by rotary evaporation. The solid product was recrystallized from hexane's and dried under reduced pressure to yield 85%, mp 51–52° C. The product was identified by $^1$H and $^{13}$C NMR and IR spectroscopy.

Example 7

Synthesis of N-(bicyclo(2.2.1)hept-5-ene-2-ylmethyl)-1,1,1-trifluoro methanesulfonamide

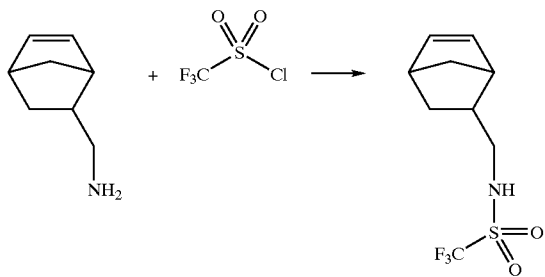

Into a dry 1 lit. round bottom flask equipped with a magnetic stirrer, condenser and an addition funnel was added 500 ml of dry distilled tetrahydrofuran, 165 ml of triethylamine and 80 g (0.65 moles) of norbornyl amine. The reaction mixture was cooled to 0° C. To the mixture was added via the additional funnel 100 g (0.59 moles) of methanesulfonyl chloride and the reaction mixture was stirred overnight. The reaction mixture was filtered to remove the pyridinium hydrochloride salt and the filtrate was rotodvaped to remove tetrahydrofuran, resulting in an solid. The solid was dissolved in diethylether, and the resulting solution was extracted several times with deionized water. After treating with decolorizing carbon and drying over anhydrous sodium sulfate, the solution was filtered and the solvent was removed by rotary evaporation. The resulting yellow oily product was eluted through a column of silica with hexane/ether (10:1) mixture to yield a colorless oil in 60%, yield. The product was identified by $^1$H and $^{13}$C NMR and Mass spectroscopy.

Example 8
Synthesis of N-(bicyclo(2.2.1)hept-5-ene-2-ylmethyl)-N,N dimethylaminosulfonamide

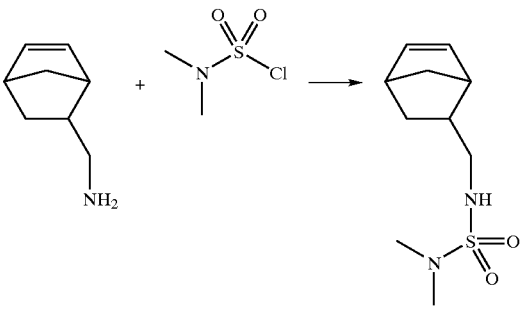

Into a dry 1 lit. round bottom flask equipped with a magnetic stirrer, condenser and an addition funnel was added 500 ml of dry distilled tetrahydrofuran, 190 ml of triethylamine and 94.4 g (0.765 moles) of norbornyl amine. The reaction mixture was cooled to 0° C. To the mixture was added via the additional funnel 100 g (0.69 moles) of methanesulfonyl chloride and the reaction mixture was stirred overnight. The reaction mixture was filtered to remove the pyridinium hydrochloride salt and the filtrate was rotovaped to remove tetrahydrofuran, resulting in an solid. The solid was dissolved in diethylether, and the resulting solution was extracted several times with deionized water. After treating with decolorizing carbon and drying over anhydrous sodium sulfate, the solution was filtered and the solvent was removed by rotary evaporation. The resulting light yellow solid was crystallized from hexane's and dried under reduced pressure in 85% yield. Mpt. 56° C. The product was identified by $^1$H and $^{13}$C NMR and Mass spectroscopy.

Example 9
Synthesis of N-(bicyclo(2.2.1)hept-5-ene-2-ylmethyl)camphor sulfonamide

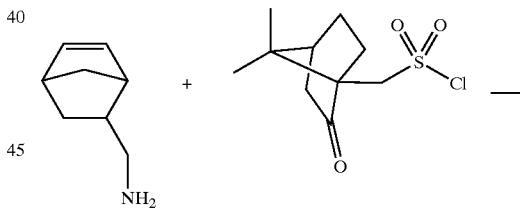

An oven-dried, nitrogen-flushed 1 L round bottom flask equipped with an addition funnel, nitrogen inlet, reagent inlet, and a teflon-coated stir bar was charged with 44.7 g 5-aminomethylnorbornene (0.5 mol,) 47.7 g triethylamine (0.65 mol,) and 300 mL dichloromethane. The addition funnel was charged with 100 g (+/−) 10-camphorsulfonyl chloride (0.55 mol,) and 200 mL dichloromethane. The contents of the addition funnel were added dropwise to the flask over the course of approx. two hours. During this time, the reaction gradually warmed and finally began a gentle reflux. The reaction was left to stir for approx. 24 hours. Unreacted sulfonyl chloride was destroyed by addition of 50 mL water to the reaction mixture; following water addition, the mixture was allowed to stir for two hours. An additional 100 mL water was added to the mixture, and the mixture was transferred to a separatory funnel. The organic layer was separated and washed once with 200 mL water, once with 200 mL dilute sodium bicarbonate, and once with 200 mL brine. The organic layer was then concentrated to yield a solid, and dried under vacuum overnight. The solids were redissolved in about 1.5 L of ethyl acetate:hexanes (35:65) and treated with about 5 g activated charcoal. Following filtration through a 2" thick silica gel plug, the solution was concentrated, and the resulting materials were recrystallized from ethyl acetate:hexane (approximately 15:85.) The resulting crystalline mass was recovered on a filter, washed with 2×200 mL ice cold ethyl acetate:hexane (10:90,) and once with 200 mL ice cold hexane. The solids thus obtained were dried in vacuum to yield 65.5 g (39%; mp 98–103° C.) of the desired camphorsulfonamide as a mixture of isomers. The filtrate was concentrated and two additional recrystallizations yielded increasingly hexane-soluble isomeric compositions of camphorsulfonamide (as distinct mixtures of isomers) in 42 (mp 72–80° C.) and 31 g (mp 45–56° C.) recoveries. The total recovered solids provided a 83% Yield. The product was identified by $^1$H and $^{13}$C NMR and Mass spectroscopy.
M Preparation of Polymers

Example 10

Norbornene Sulfonamide/SO2 Copolymer

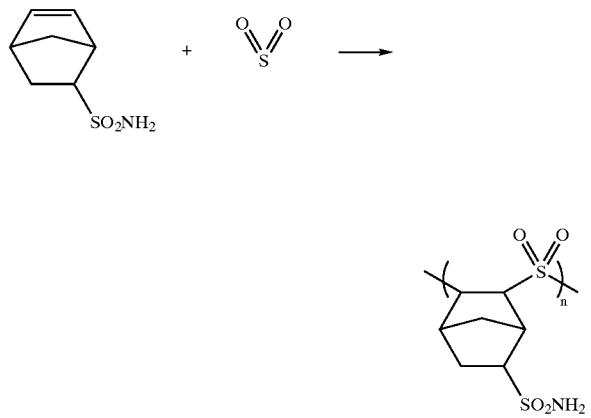

The norbornene Sulfonamide (1.0 g, 5.78 mmol) was dissolved at −45° C. in a mixture of liquid SO$_2$ (20 ml) and tetrahydrofuran (5 ml) freshly distilled over sodium. Poly merization was initiated by addition of 0.05 ml of a 5M solution of t-butyl hydrogenperoxide. Polymer precipitated immediately.

Example 11

N-(bicyclo(2.2.1)hept-5-ene-2-ylmethyl)-1,1,1-trifluoro methanesulfonamide/Maleic Anhydride Copolymers

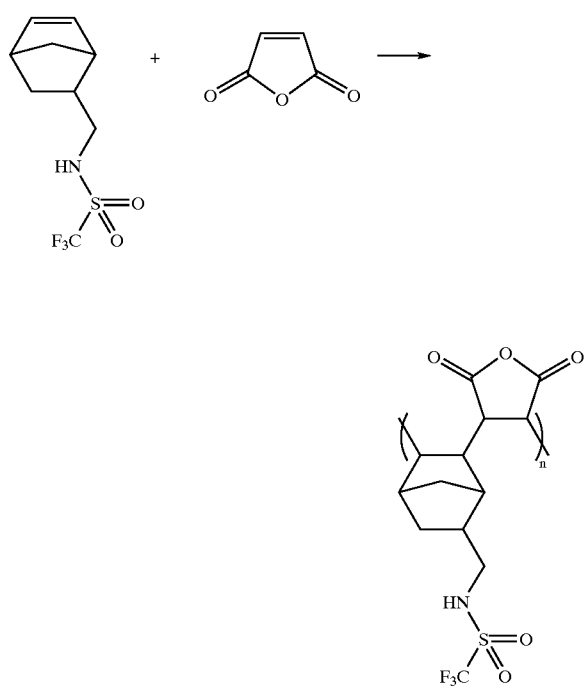

The N-(bicyclo(2.2.1)hept-5-ene-2-ylmethyl)1,1,1-trifluoro methanesulfonamide (7.5 g, 30 mmol), Maleic anhydride(2.90 g, 30 mmol), 2,2'-azabisisobutyronitrile (AIBN) (0.40 g, 2.4 mmol) and 30 gr. of dry tetrahydrofuran were placed in a round bottom flask equipped with a water condenser and a firestone valve. The solution was evacuated and purged with nitrogen (4 times) with the aid of the firestone valve. The solution was heated to reflux for 18 hrs. The polymer solution was cooled, diluted with 20 ml of acetone and precipitated dropwise into 800 ml of hexane. The precipitated polymer was separated by decantation, rinsed twice with hexane's and dried under Vacuum (yield 3.3 g). Reprecipitating from acetone into mixtures of hexane/isopropanol (90/10) further purified the isolated polymer. %). The polymer was further characterized using GPC, IR and NMR. The Weight Avg. Mol. Wt of the polymer was observed to be 1,350. The glass transition temperature of the alternating copolymer was found via DSC to be 79° C.

Example 12

Synthesis of N-(bicyclo(2.2.1)hept-5-ene-2-ylmethyl)propanesulfonamide homopolymer

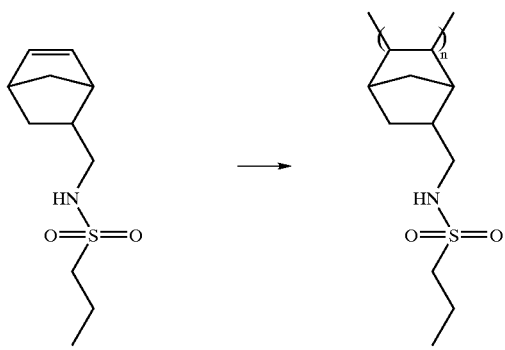

To a glass vial containing a stir bar was added under nitrogen atmosphere 20.25 g (0.108 mol.) of N-(bicyclo(2.2.1)hept-5-ene-2-ylmethyl) propanesulfonamide, followed by 55 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.53 g (1.08 mmol.) $(CH_3C_6H_4)Ni(PhF_5)_2$ in 3 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved in tetrahydrofuran and reprecipitated into methyl t-butyl ether. The precipitated polymer is filtered and dried overnight under reduced pressure. The overall yield of polymer was 15.0 g (75%). The polymer was further characterized using GPC, IR and NMR. The Mol. Wt of the polymer was observed to be Mn=13,000, with a Mw of 23,000. IR and $^1$H NMR clearly indicated presence of sulfonamide group.

Example 13

Synthesis of N-(bicyclo(2.2.1)hept-5-ene-2-ylmethyl)-1,1,1, trifluoro methanesulfonamide homopolymer

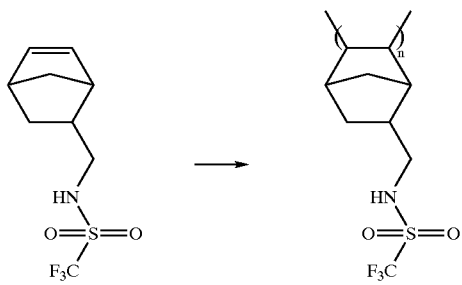

To a glass vial containing a stir bar was added under nitrogen atmosphere 15 g (0.058 mol.) of N-(bicyclo(2.2.1) hept-5-ene-2-ylmethyl)-1,1,1 trifluoro methanesulfonamide, followed by 22 ml of toluene. The reaction mixture was purged with Argon for 10 min. To the reaction solution at room temperature was added via syringe the nickel catalyst solution in a monomer to catalyst ratio of 100/1. The catalyst solution was prepared inside the dry box by adding 0.287 g (0.58 mmol.) $(CH_3C_6H_4)Ni(PhF_5)_2$ in 3 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into hexane's. The precipitated polymer was filtered, redissolved in methyl t-butyl ether and reprecipitated into hexane's. The precipitated polymer is filtered and dried overnight under reduced pressure. The overall yield of polymer was 10.1 g (67%). The polymer was further characterized using GPC, IR and NMR. IR and $^1$H NMR clearly indicated presence of sulfonamide group.

Example 14

Synthesis of N-(bicyclo(2.2.1)hept-5-ene-2-ylmethyl)methanesulfonamide/t-butylester of Norbornene copolymer (40/60)

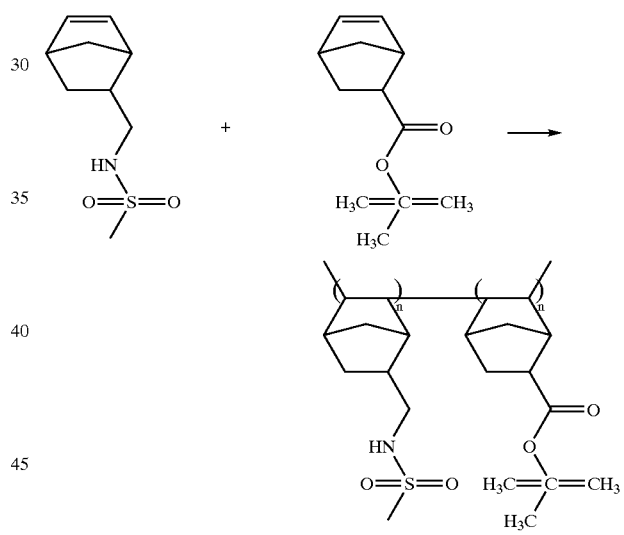

To a glass vial containing a stir bar was added under nitrogen atmosphere 5.31 g (26.4 mmol.) of N-(bicyclo(2.2.1)hept-5-ene-2-ylmethyl) methanesulfonamide, 7.7 g (39.6 mmol.) of t-butylester of norbornene, followed by 25 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.32 g (0.66 mmol.) $(CH_3C_6H_4)Ni(PhF_5)_2$ in 3 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into hexane's. The precipitated polymer is filtered and dried overnight under reduced pressure. The overall yield of polymer was 12.0 g (92%). The polymer was further characterized using GPC, IR and NMR. The Mol. Wt of the polymer was observed to be Mn=16,000, with a Mw of 33,000. IR and $^1$H NMR clearly indicated presence of sulfonarnide group.

Example 15

Synthesis of N-(bicyclo(2.2.1)hept-5-ene-2-ylmethyl)propanesulfonamide/t-butylester of Norbornene copolymer (40/60)

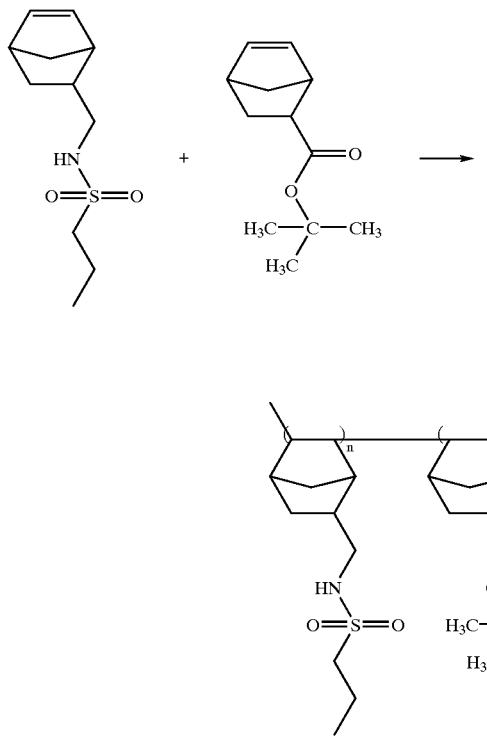

To a glass vial containing a stir bar was added under nitrogen atmosphere 13.69 g (73.2 mmol.) of N-(bicyclo (2.2.1)hept-5-ene-2-ylmethyl)propanesulfonamide, 21.36 g (0.11 mol.) of t-butylester of norbornene, followed by 85 ml of toluene. The reaction mixture was purged with Argon for 10 min. To the reaction solution at room temperature was added via syringe the nickel catalyst solution in a monomer to catalyst ratio of 100/1. The catalyst solution was prepared inside the dry box by adding 0.89 g (1.83 mmol.) (CH$_3$C$_6$H$_4$)Ni(PhF$_5$)$_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved tetrahydrofuran and reprecipitated into methyl t-butyl ether. The precipitated polymer is filtered and dried overnight under reduced pressure. The overall yield of polymer was 13 g (37%). The polymer was further characterized using GPC, IR and NMR. The Mol. Wt of the polymer was observed to be Mn=24,000, with a Mw of 44,000. IR and $^1$H NMR clearly indicated presence of sulfonamide group.

Example 16

Synthesis of N-(bicyclo(2.2.1)hept-5-ene,) propanesulfonamide/t-butylester of Norbornene copolymer (60/40)

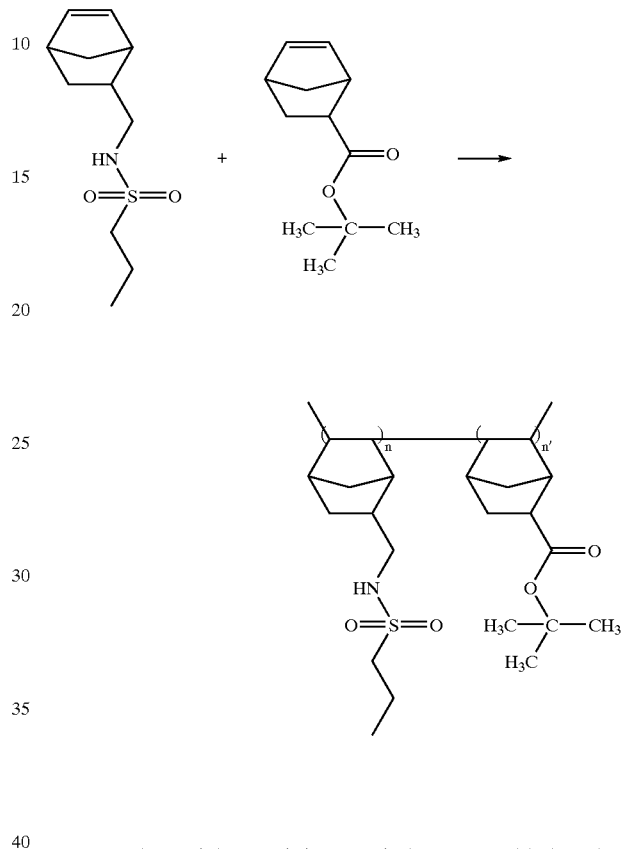

To a glass vial containing a stir bar was added under nitrogen atmosphere 20.9 g (0.11 mol.) of N-(bicyclo(2.2.1) hept-5-ene-2-ylmethyl)propanesulfonamide, 14.31 g (0.073 mol.) of t-butylester of norbornene, followed by 85 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.89 g (1.83 mmol.) (CH$_3$C$_6$H$_4$)Ni(PhF$_5$)$_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved tetrahydrofuran and reprecipitated into methyl t-butyl ether. The precipitated polymer is filtered and dried overnight under reduced pressure. The overall yield of polymer was 24 g (70%). The polymer was further characterized using GPC, IR and NMR. The Mol. Wt of the polymer was observed to be Mn=17,000, with a Mw of 39,000. IR and $^1$H NMR clearly indicated presence of sulfonamide group.

Example 17

Synthesis of N-(bicyclo(2.2.1)hept-5-ene-2-ylmethyl)propanesulfonamide/t-butylester of Norbornene copolymer (80/20)

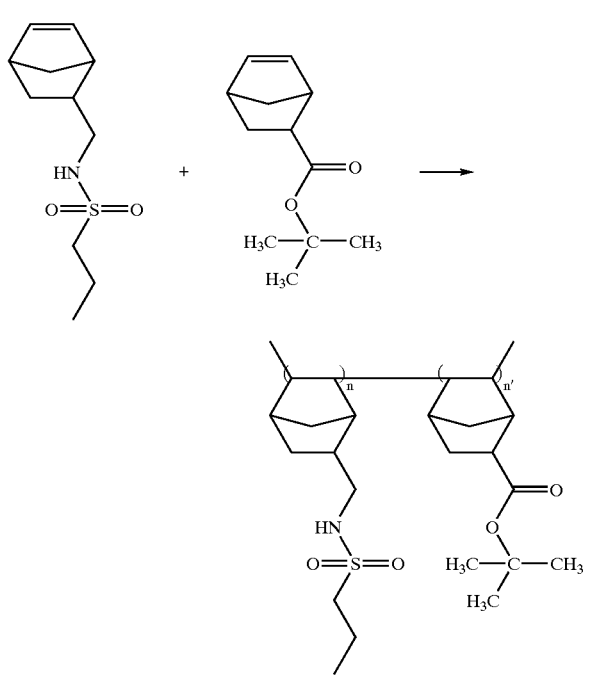

To a glass vial containing a stir bar was added under nitrogen atmosphere 27.8 g (0.148 mol.) of N-(bicyclo (2.2.1)hept-5-ene-2-ylmethyl)propanesulfonamide, 7.2 g (0.037 mol.) of t-butylester of norbornene, followed by 85 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.89 g (1.83 mmol.) $(CH_3C_6H_4)Ni(PhF_5)_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved tetrahydrofuran and reprecipitated into methyl t-butyl ether. The precipitated polymer is filtered and dried overnight under reduced pressure. The overall yield of polymer was 28 g (87%). The polymer was further characterized using GPC, IR and NMR. The Mol. Wt of the polymer was observed to be Mn=15,000, with a Mw of 34,000. IR and $^1$H NMR clearly indicated presence of sulfonamide group.

Example 18

Synthesis of N-(bicyclo(2.2.1)hept-5-ene-2-ylmethyl)propanesulfonamide/norbornene carboxylic acid copolymer (40/60)

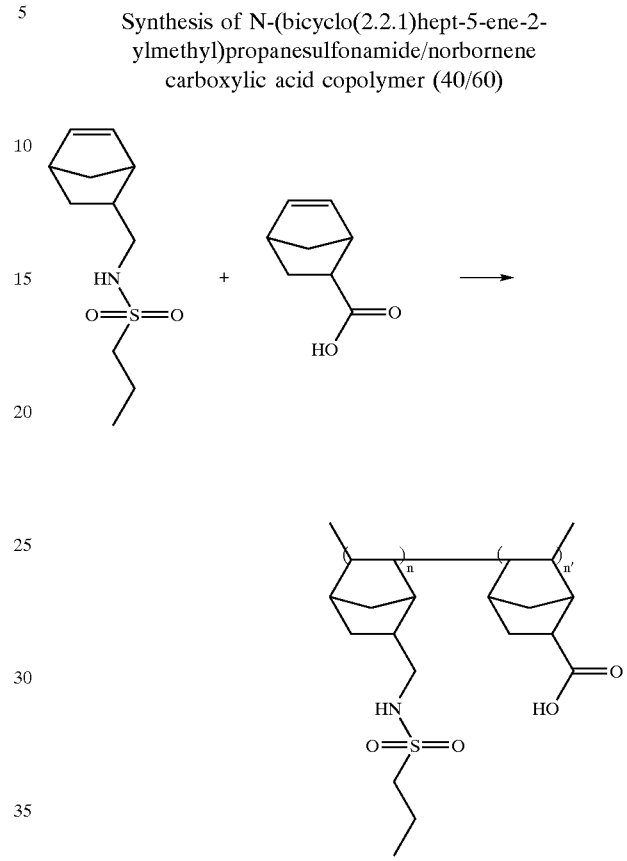

To a glass vial containing a stir bar was added under nitrogen atmosphere 13.04 g (0.069 mol.) of N-(bicyclo (2.2.1)hept-5-ene-2-ylmethyl)propanesulfonamide, 21.96 g (0.104 mol.) of trimethylsilyl ester of norbornene carboxylic acid, followed by 85 ml of toluene. The reaction mixture was purged with Argon for 10 minutes. To the reaction solution at room temperature was added via syringe the nickel catalyst solution in a monomer to catalyst ratio of 50/1. The catalyst solution was prepared inside the dry box by adding 1.7 g (3.49 mmol.) $(CH_3C_6H_4)Ni(PhF_5)_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved tetrahydrofuran and reprecipitated into methyl t-butyl ether. The precipitated polymer is filtered and dried overnight under reduced pressure. The overall yield of polymer was 12 g (35%). The polymer was further characterized using GPC, IR and NMR. IR and $^1$H NMR clearly indicated presence of sulfonamide and carboxylic acid group.

Example 19

Synthesis of N-(bicyclo(2.2.1)hept-5-ene-2-ylmethyl)propanesulfonamide/norbornene carboxylic acid copolymer (60/40)

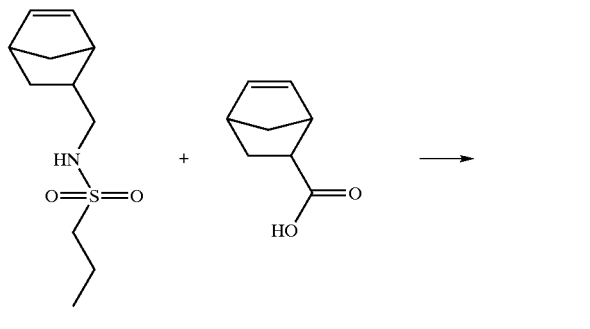

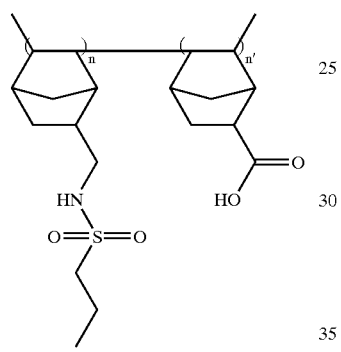

To a glass vial containing a stir bar was added under nitrogen atmosphere 20.0 (0.106 mol.) of N-(bicyclo(2.2.1) hept-5-ene-2-ylmethyl)propanesulfonamide, 14.9 g (0.07 mol.) of trimethylsilyl ester of norbornene carboxylic acid, followed by 85 ml of toluene. The reaction mixture was purged with Argon for 10 minutes. To the reaction solution at room temperature was added via syringe the nickel catalyst solution in a monomer to catalyst ratio of 50/1. The catalyst solution was prepared inside the dry box by adding 1.7 g (3.49 mmol.) $(CH_3C_6H_4)Ni(PhF_5)_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved tetrahydrofuran and reprecipitated into methyl t-butyl ether. The precipitated polymer is filtered and dried overnight under reduced pressure. The overall yield of polymer was 13 g (35%). The polymer was further characterized using GPC, IR and NMR. IR and $^1$H NMR clearly indicated presence of sulfonamide and carboxylic acid group.

Example 20

Synthesis of N-(bicyclo(2.2.1)hept-5-ene-2-ylmethyl)-1,1,1trifluoromethanesulfonamide/t-butylester of Norbornene copolymer (80/20)

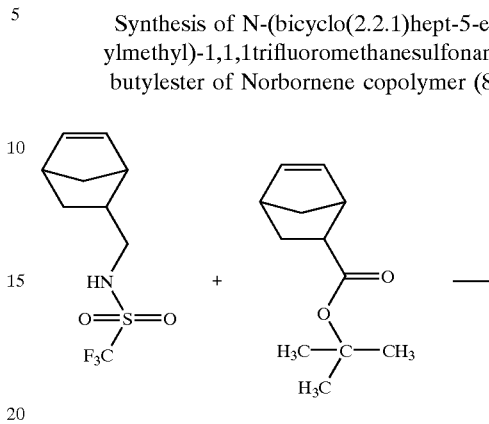

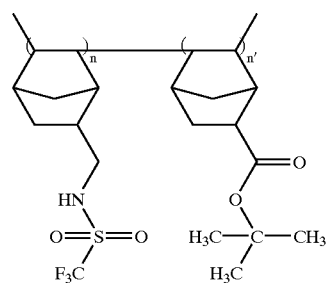

To a glass vial containing a stir bar was added under nitrogen atmosphere 17.35 g (068 mol.) of N-(bicyclo(2.2.1) hept-5-ene-2-ylmethyl)-1,1,1 trifluoro methanesulfonamide, 3.3 g (0.017 mol.) of t-butylester of norbornene, followed by 30 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.414 g (0.85 mmol.) $(CH_3C_6H_4)Ni(PhF_5)_2$ in 3 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into hexanes. The precipitated polymer was filtered, redissolved methyl t-butyl ether and reprecipitated into hexanes. The precipitated polymer is filtered and dried overnight under reduced pressure. The overall yield of polymer was 13 g (65%). The polymer was further characterized using GPC, IR and NMR. IR and $^1$H NMR clearly indicated presence of sulfonamide group.

Example 21

Synthesis of N-(bicyclo(2.2.1)hept-5-ene-2-ylmethyl)-1,1,1 trifluoromethanesulfonamide/t-butylester of Norbornene copolymer (60/40)

Example 22

Synthesis of N-(bicyclo(2.2.1)hept-5-ene-2-ylmethyl)propanesulfonamide/t-butylester of Norbornene/N-(bicyclo(2.2.1)hept-5-ene-2-ylmethyl) acetate terpolymer (40/40/20)

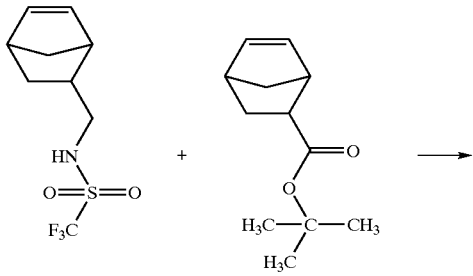

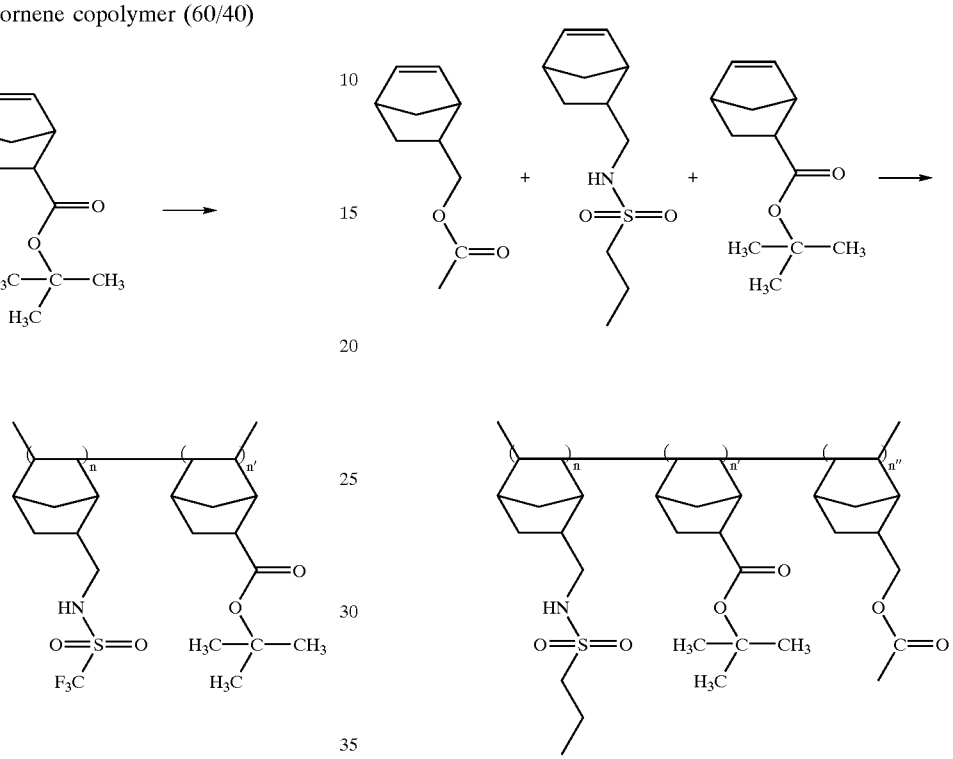

To a glass vial containing a stir bar was added under nitrogen atmosphere 14.0 g (0.055 mol.) of N-(bicyclo(2.2.1)hept-5-ene-2-ylmethyl)-1,1,1 trifluoromethanesulfonamide, 7.1 g (0.036 mol.) of t-butylester of norbornene, followed by 55 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.477 g (0.98 mmol.) $(CH_3C_6H_4)Ni(PhF_5)_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into hexanes. The precipitated polymer was filtered, redissolved methyl t-butyl ether and reprecipitated into hexanes. The precipitated polymer is filtered and dried overnight under reduced pressure. The overall yield of polymer was 14 g (65%). The polymer was further characterized using GPC, IR and NMR. The Mol. Wt of the polymer was observed to be $Mn=18,000$, with a $Mw$ of 40,500. IR and $^1H$ NMR clearly indicated presence of sulfonamide group.

To a glass vial containing a stir bar was added under nitrogen atmosphere 12.09 (0.065 mol.) of N-(bicyclo(2.2.1)hept-5-ene-2-ylmethyl) propanesulfonamide, 12.54 g (0.065 mol.) of t-butylester of norbornene, 5.36 g (0.029 mol.) of N-(bicyclo(2.2.1)hept-5-ene-2-ylmethyl) acetate, followed by 60 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.78 g (1.62 mmol.) $(CH_3C_6H_4)Ni(PhF_5)_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved tetrahydrofuran and reprecipitated into methyl t-butyl ether. The precipitated polymer is filtered and dried overnight under reduced pressure. The overall yield of polymer was 21 g (70%). The polymer was further characterized using GPC, IR and NMR. The Mol. Wt of the polymer was observed to be $Mn=19,000$, with a $Mw$ of 40,000. IR and $^1H$ NMR clearly indicated presence of sulfonamide group.

Example 23

Synthesis of N-(bicyclo(2.2.1)hept-5-ene-2-ylmethl) methanesulfonamide/Norbornene carboxylic acid/t-butylester of Norbornene terpolymer

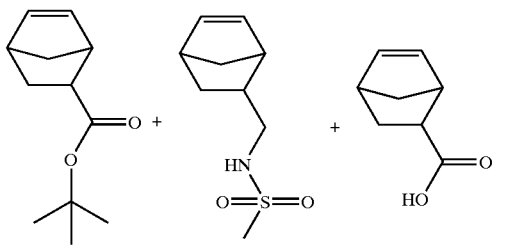

Example 24

Synthesis of Poly(2-methanesulfonylaminomethyl-5-norbornene-co-maleic anhydride)

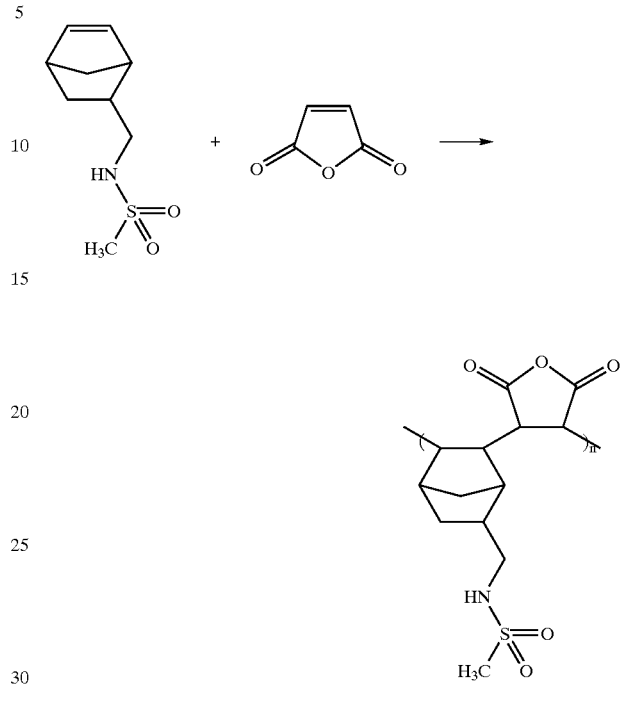

To a glass vial containing a stir bar was added under nitrogen atmosphere 5 g (0.025 mol.) of N-(bicyclo(2.2.1) hept-5-ene-2-ylmethyl)methanesulfonamide, 8.05 g (0.041 mol.) of t-butylester of norbornene, 3.48 g (0.016 mol.) trimethylsilyl protected norbornene carboxylic acid, followed by 30 ml of toluene. The reaction mixture was purged with Argon for 10 minutes. To the reaction solution at room temperature was added via syringe the nickel catalyst solution in a monomer to catalyst ratio of 100/1. The catalyst solution was prepared inside the dry box by adding 0.403 g (0.83 mmol.) $(CH_3C_6H_4)Ni(PhF_5)_2$ in 5 ml of toluene. The polymerization was allowed to stir for 6 hours after which the solution was diluted with tetrahydrofuran. The resulting polymer solution was treated first with preconditioned imidoacetic acid based Amberlite IRC-718 chelating resin, followed by Sulfonic acid based Amberlyst 18 ion exchange resin. The polymer solution is filtered, concentrated via rotary evaporation and precipitated into methyl t-butyl ether. The precipitated polymer was filtered, redissolved tetrahydrofuran and reprecipitated into methyl t-butyl ether. The precipitated polymer is filtered and dried overnight under reduced pressure. The overall yield of polymer was 11 g (65%). The polymer was further characterized using GPC, IR and NMR. The Mol. Wt of the polymer was observed to be Mn=16,600, with a Mw of 40,000. IR and $^1$H NMR clearly indicated presence of sulfonamide group.

2-Methanesulfonylaminomethyl-5-norbornene (5.54 g, 0.03 mole), maleicanhydride (2.90 g, 0.03 mole), 2,2'-azobisisobutyronitrile (AIBN) (0.40 g, 0.0024 mole) and 30 g of dry tetrahydrofuran were placed in a round bottom flask equipped with a water condenser and a Firestone valve. The solution was evacuated and purged with nitrogen (4 times) with the aid of the Firestone valve. The solution was heated to reflux for 18 hours. Afterwards, this solution was added drop wise into 750 ml Isopropyl alcohol. The precipitated polymer was filtered through a frit funnel, washed with 2×50 ml petroleum ether and dried under vacuum (Yield: 4.05 g). Mw=2,600 Tg=167 degree C.

Example 25

Palladium Example (10,000:1:5 Monomers:Pd:LiFABA)

Butylnorbornene (0.80 g, 0.0053 mol) and the propyl sulfonamide NB (0.14 g, 0.00059 mol) were dissolved in sufficient toluene to make a 1 M solution. Allylpalladiumtri-cyclohexylphosphine trifluoroacetate (0.0003 g, 0.0006 mmol) and lithium tetrakis(pentafluorophenyl)borate.2.5 diethylether (LiFABA) (0.0026 g, 0.003 mmol) were combined in toluene and then added to the monomers. The mixture was stirred at 80° C. for 6 hours. The viscous mixture was poured into acetone. The polymer precipitated, was filtered and dried. Yield 0.47 g (50%). Mw=300,000 and Mn=147,000 as determined by GPC. Based on H-1 NMR data, about 12 mole percent of the sulfonamide was incorporated into the copolymer.

What is claimed is:

1. A polymer containing repeat units derived from a norborne sulfonamide monomer having the formula

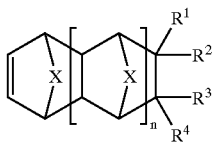

wherein x represents oxygen, nitrogen with hydrogen or a $C_{1-10}$ alkyl linear or branched being bonded thereto, sulfur or a methylene group of the formula —$(CH_2)_{n'}$—; n' is an integer of 1 to 5; n is an integer of 0, 1 or more and $R^1$ and $R^4$ independently represent hydrogen, linear or branched linear and branched $C_1$–$C_{20}$ alkyl; $R^2$ and $R^3$ independently represent hydrogen, linear and branched $C_1$–$C_{20}$ alkyl or a sulfonamide group, with the proviso that at least one of $R^2$ and $R^3$ is a pendant sulfonamide group of the formulae:

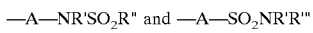

or a cyclic sulfonamide group formed by combining $R^2$ and $R^3$ together with the two ring carbon atoms to which they are attached to form a heterocyclic ring of the formula:

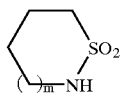

wherein m is an integer from 1 to 3;

R' represents hydrogen, linear and branched tri($C_1$–$C_{10}$) alkylsilyl, —C(O)CF$_3$, —C(O)OR, and —OC(O)OR, wherein R is linear and branched $C_1$–$C_{10}$ alkyl, linear and branched $C_1$–$C_{10}$ haloalkyl, substituted and unsubstituted $C_6$–$C_{14}$ aryl, and substituted and unsubstituted $C_7$–$C_{20}$ aralkyl;

R" represents linear and branched $C_1$–$C_{10}$ alkyl, linear and branched $C_1$–$C_{10}$ haloalkyl, —C(O)OR, —(CHR$^1$)$_{n''}$—OR, —(CHR$^1$)$_{n''}$—C(O)R, substituted and unsubstituted $C_3$ to $C_8$ cycloalkyl cyclic esters (lactones) containing 2 to 8 carbon atoms (not counting the carbonyl carbon), cyclic ketones containing 4 to 8 carbon atoms (not counting the carbonyl carbon), cyclic ethers and cyclic diethers containing 4 to 8 carbon atoms, wherein R is as defined above, R$^{1'}$ is as defined below and n" represents an integer from 1 to 10;

R'" represents hydrogen, linear and branched $C_1$–$C_{10}$ alkyl, linear and branched $C_1$–$C_{10}$ haloalkyl, —C(O)OR, —(CHR$^1$)$_{n''}$—OR, —(CHR$^1$)$_{n''}$—C(O)R, substituted and unsubstituted $C_3$ to $C_8$ cycloalkyl, cyclic esters (lactones) containing 2 to 8 carbon atoms (not counting the carbonyl carbon), cyclic ketones containing 4 to 8 carbon atoms (not counting the carbonyl carbon), cyclic ethers and cyclic diethers containing 4 to 8 carbon atoms, wherein R is as defined above, R$^{1'}$ is as defined below, and n" is as defined above;

—A— represents a divalent radical selected from the group consisting of —(CR$^{1'}$R$^{2'}$)$_{n''}$—; —(CHR$^{1'}$)$_{n''}$O(CHR$^{1'}$)$_{n''}$—; —(CHR$^{1'}$)$_{n''}$C(O)O(CHR$^{1'}$)$_{n''}$—; —(CHR$^{1'}$)$_{n''}$C(O)(CHR$^{1'}$)$_{n''}$—; $C_3$–$C_8$ cycloalkyl; $C_6$–$C_{14}$ aryl; cyclic ethers and cyclic diethers containing 4 to 8 carbon atoms, wherein n" represents an integer from 1 to 10, and R$^{1'}$ and R$^{2'}$ independently represent hydrogen, linear and branched $C_1$–$C_{10}$ alkyl and halogen, and the group —(CHR$^1$)$_{n''}$OC(O)— but only when the sulfonamide group is —NR'SO$_2$R";

and optionally one or more norbornene-type monomer(s) represented by the formula

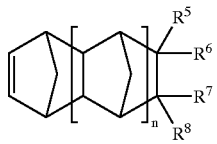

wherein $R^5$ to $R^8$ independently represents a hydrocarbyl or a functional substituent and n is an integer of 0 or 1 or more.

2. A polymer of claim 1 obtained by ring-opening metathesis polymarization or by addition polymerization.

3. A polymer of claim 2 obtained by ring-opening metathesis polymerization that is thereafter hydrogenated.

4. A polymer of claim 1 obtained by addition polymerization.

5. A polymer of claim 4 wherein n is an integer of 0 to 5 and —A— is a divalent radical selected from (a) —(CR$^{1'}$R$^{2'}$)$_{n''}$—;

(b) —(CHR$^{1'}$)$_{n''}$O(CHR$^{1'}$)$_{n''}$—;

(c) —(CHR$^{1'}$)$_{n''}$C(O)O(CHR$^{1'}$)$_{n''}$—;

(d) —(CHR$^{1'}$)$_{n''}$C(O)(CHR$^{1'}$)$_{n''}$—;

(e) —(CHR$^{1'}$)$_{n''}$OC(O)— only when the sulfonamide group is —NR'SO$_2$R" where n represents an integer from 1 to 10; and $R^1$ and $R^2$ independently represent hydrogen, linear and branched $C_1$–$C_{10}$ alkyl and halogen; R' and R" are as defined above;

(f) a divalent cycloalkyl radical represented by the formula

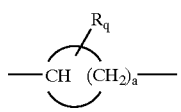

wherein "a" is an integer from 2 to 7 and optionally $R^q$ which, when present, represents linear and branched $C_1$–$C_{10}$ alkyl groups, linear and branched $C_1$–$C_{10}$ haloalkyl, and halogen.

6. A polymer of claim 5 wherein the divalent cycloalkyl radical is a cyclopentylene or a cyclohexylene having the following structures

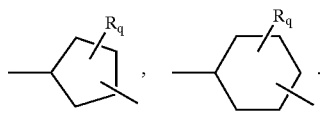

7. A polymer of claim 4 wherein the norbornene sulfonamide monomer is represented by the structure

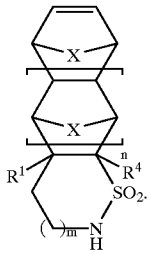

Ia

8. A polymer of claim 7 wherein $R^1$ to $R^4$ are hydrogen.
9. A polymer of claim 4 which is a homopolymer of a norbornene sulfonamide.
10. A polymer of claim 4 containing repeating units derived from a norbornene sulfonamide and from at least one coknonomer selected from the group consisting of a monomer having the structure

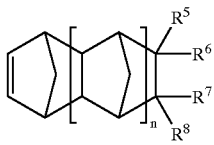

II wherein $R^5$ to $R^8$ independently represents a hydrocarbyl or functional substituent and n is an integer of 0, 1 or more; maleic anlydride; sulfur dioxide ($SO_2$); carbon monoxide (CO); and an acrylate.

11. A polymer of claim 10 wherein the repeat units derived from a norbornene sulfonamide and from a comonomer constitute from 20 to 80 mole percent to 80 to 20 mole percent, respectively.

12. A polymer of claim 10 wherein $R^5$ to $R^8$ are hydrocarbyl groups selected from the group consisting of hydrogen, linear and branched $C_1$–$C_{10}$ alkyl, linear and branched $C_1$–$C_{10}$ haloalkyl, linear and branched $C_2$–$C_{10}$ alkenyl, linear and branched $C_2$–$C_{10}$ alkenyl, $C_5$–$C_{12}$ cycloalkyl, $C_6$–$C_{12}$ aryl, $C_7$–$C_{24}$ aralkyl; and $R^6$ to $R^8$ together with the two ring carbon atoms to which they are attached can represent a cycloaliphatic group containing 4 to 12 carbon atoms or an aryl group containing 6 to 14 carbon atoms.

13. A polymer of claim 10 wherein the acrylate monomer is represented by the formulae $CH_2=CHR^{12}C(O)OR^{10}$ and $CH_2=CHR^{12}C(O)OR^{13}$, wherein $R^{12}$ is hydrogen or methyl, $R^{13}$ is a sulfonamide group represented by —A—NR'SO$_2$R" and —A—SO$_2$NR'R'"

and maleimides of the formula:

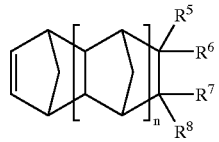

II wherein $R^{10}$ represents a moiety selected from —(CH$_3$)$_3$, —Si(CH$_3$)$_3$—CH($R^{11}$)OCH$_2$CH$_3$, —CH($R^{11}$)OC(CH$_3$)$_3$ or alicyclic and heterocyclic groups and $R^{14}$ represents hydrogen, linear and branched $C_1$–$C_{10}$ alkyl, substituted and unsubstituted cycloalkyl, and substituted and unsubstituted $C_6$–$C_{14}$ aryl.

14. A polymer of claim 10 having repeat units derived from a norbornene sulonamide and t-butylester of norbornene.

15. A polymer of claim 14 wherein the norbornene sulfonamide is N-bicyclo(2.2.1)hept-5-ene-2-ylmethyl methanesulfonamide.

16. A polymer of claim 14 wherein the norbornene sulfonamide is N-bicyclo(2.2.1)hept-5-ene-2-ylmethyl propanesulfonamide.

17. A polymer of claim 14 wherein a norbornene sulfonamide and t-butyl ester of norbornene constitute 40 to 60 mole percent to 60 to 40 mole percent, respectively.

18. A polymer of claim 10 which is a terpolymer.

19. A polymer of claim 4 containing repeat units derived from a norbornene sulfonamide, t-butyl ester of norbornene and a comonomer selected from the group consisting of a monomer having the structure

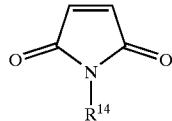

wherein $R^5$ to $R^8$ independently represents a hydrocarbyl or functional substituent and n is an integer of 0, 1 or more; maleic anlydride; sulfur dioxide ($SO_2$); carbon monoxide (CO); and acrylate.

20. A terpolymer of claim 19 wherein the comonomer is (N-bicyclo(2.2.1)hept-5-ene-2-ylmethyl) acetate.

* * * * *